(12) United States Patent
Gray

(10) Patent No.: US 9,714,140 B1
(45) Date of Patent: Jul. 25, 2017

(54) BELT CONFIGURED TO INCLUDE RIGID PORTIONS

(71) Applicant: James D. Gray, Elmira, NY (US)

(72) Inventor: James D. Gray, Elmira, NY (US)

( * ) Notice: Subject to any disclaimer, the term of this patent is extended or adjusted under 35 U.S.C. 154(b) by 0 days.

(21) Appl. No.: 15/161,474

(22) Filed: May 23, 2016

(51) Int. Cl.
*B65G 15/30* (2006.01)
*F16H 7/02* (2006.01)
*F16H 1/24* (2006.01)
*F16G 1/24* (2006.01)

(52) U.S. Cl.
CPC ............. *B65G 15/30* (2013.01); *F16G 1/24* (2013.01); *F16H 7/02* (2013.01); *B65G 2812/02178* (2013.01); *B65G 2812/02217* (2013.01)

(58) Field of Classification Search
CPC .......... B65G 15/30; B65G 2812/02178; B65G 2812/02217; B65G 15/40; F16G 1/24; F16H 7/02
USPC .................................................. 198/819, 820
See application file for complete search history.

(56) References Cited

U.S. PATENT DOCUMENTS

| | | | |
|---|---|---|---|
| 1,202,682 A | 10/1916 | Diehl | |
| 1,683,697 A | 9/1928 | Rankin | |
| 1,780,954 A * | 11/1930 | Tomkins | B65G 15/08 100/151 |
| 2,212,024 A * | 8/1940 | Johns | B65G 15/40 198/819 |
| 2,288,669 A | 7/1942 | Atkinson | |
| 2,397,313 A * | 3/1946 | Gingras | F16G 1/00 474/237 |
| 2,557,095 A | 6/1951 | Gingras | |
| 3,501,971 A | 3/1970 | Peterson | |
| 3,605,201 A | 9/1971 | Peterson | |
| 3,619,012 A | 11/1971 | Bizier et al. | |
| 4,030,728 A * | 6/1977 | Wallace | B65H 5/023 198/688.1 |
| 4,227,424 A | 10/1980 | Schleappe | |

(Continued)

FOREIGN PATENT DOCUMENTS

| | | |
|---|---|---|
| DE | 102007060060 | 6/2009 |
| FR | 2795149 | 12/2000 |
| JP | H05221507 | 8/1993 |

OTHER PUBLICATIONS

Sclater, Neil, and Nicholas P. Chironis. Mechanisms & Mechanical Devices Sourcebook, Third Edition, McGraw-Hill 2001, pp. 176.

*Primary Examiner* — Mark A Deuble
(74) *Attorney, Agent, or Firm* — Bond, Schoeneck & King, PLLC; Jeffrey Powers

(57) ABSTRACT

A belt having a longitudinal direction extending around the first wheel and the second wheel and forming a closed shape with a circumference in the longitudinal direction. The belt has a first rigid portion and a second rigid portion each extending from the first wheel to the second wheel. The belt may be included in a drive mechanism including a first wheel, a second wheel. Accordingly, when the first wheel is rotated about its axis of rotation the rotation causes movement of the belt along the longitudinal direction such that the first rigid portion provides a pushing force on the second wheel, and the second rigid portion provides a pulling force on the second wheel. Drive mechanisms may have a longitudinal gap between a belt and wheels of the belt. Belts may have a v-shaped or arcuate cross-section. Belts may have multiple layers.

22 Claims, 16 Drawing Sheets

(56) References Cited

U.S. PATENT DOCUMENTS

| | | | | |
|---|---|---|---|---|
| 4,410,082 A | * | 10/1983 | McGinnis | B65G 15/34 198/818 |
| 4,781,666 A | | 11/1988 | Acee, Sr. | |
| 4,819,791 A | * | 4/1989 | Melander | B65G 15/40 198/818 |
| 4,828,538 A | | 5/1989 | Razien | |
| 5,108,351 A | * | 4/1992 | Parsons | F16G 1/20 474/237 |
| 6,029,801 A | * | 2/2000 | Odin | B65G 15/36 198/819 |
| 6,032,789 A | * | 3/2000 | Mayer | B65G 15/08 198/819 |
| 7,954,815 B2 | | 6/2011 | Bober et al. | |
| 7,985,201 B2 | | 7/2011 | Langley et al. | |
| 8,910,779 B2 | * | 12/2014 | Heitplatz | B65G 15/08 198/300 |
| 2007/0261942 A1 | * | 11/2007 | Armstrong | B65G 15/08 198/818 |
| 2011/0083945 A1 | * | 4/2011 | Graber | B65G 15/34 198/846 |
| 2014/0116855 A1 | * | 5/2014 | Raaz | B65G 15/36 198/819 |

\* cited by examiner

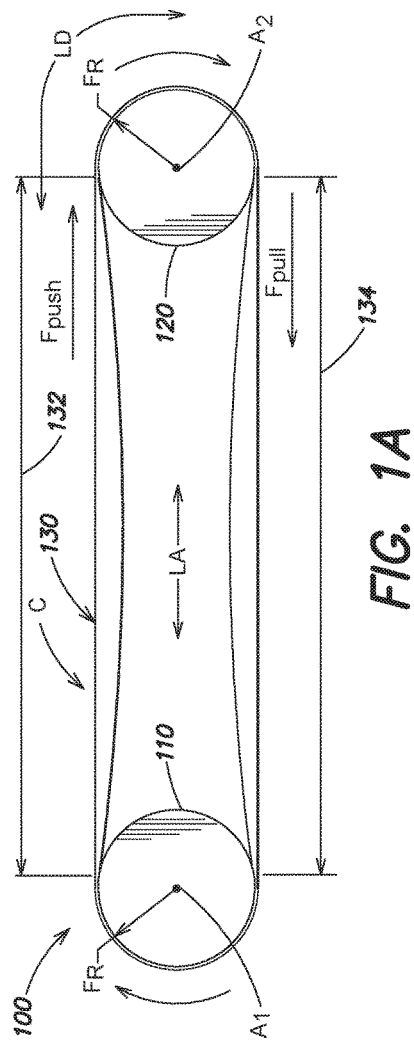
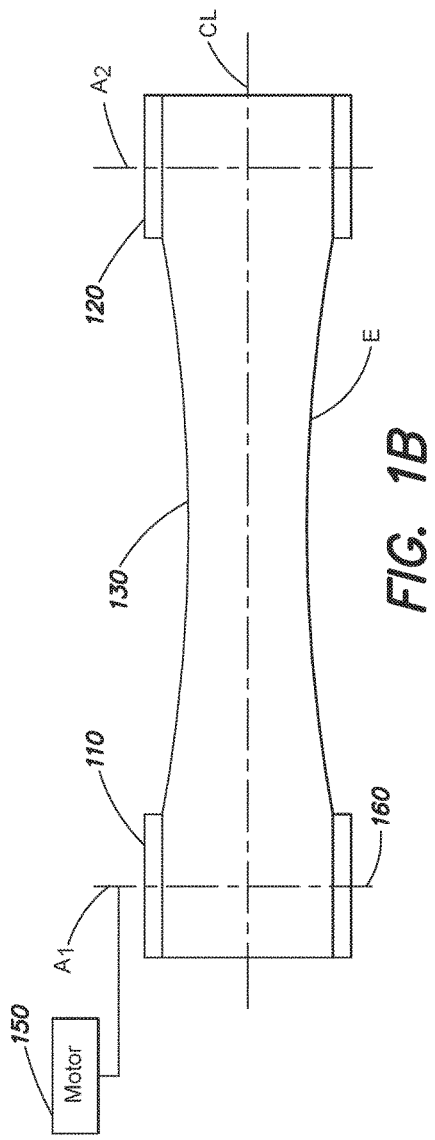
FIG. 1A
FIG. 1B

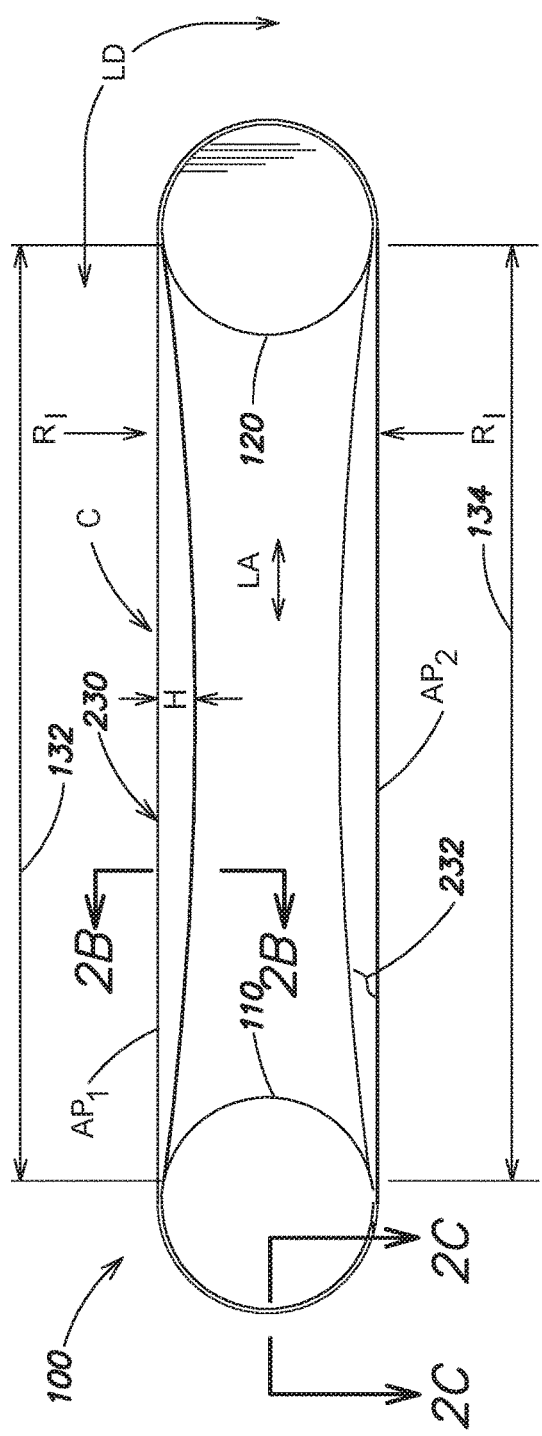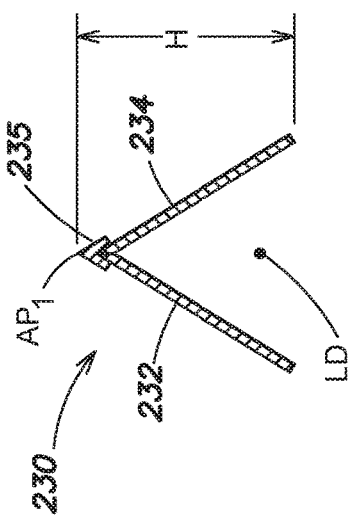
FIG. 2A
FIG. 2B
FIG. 2C

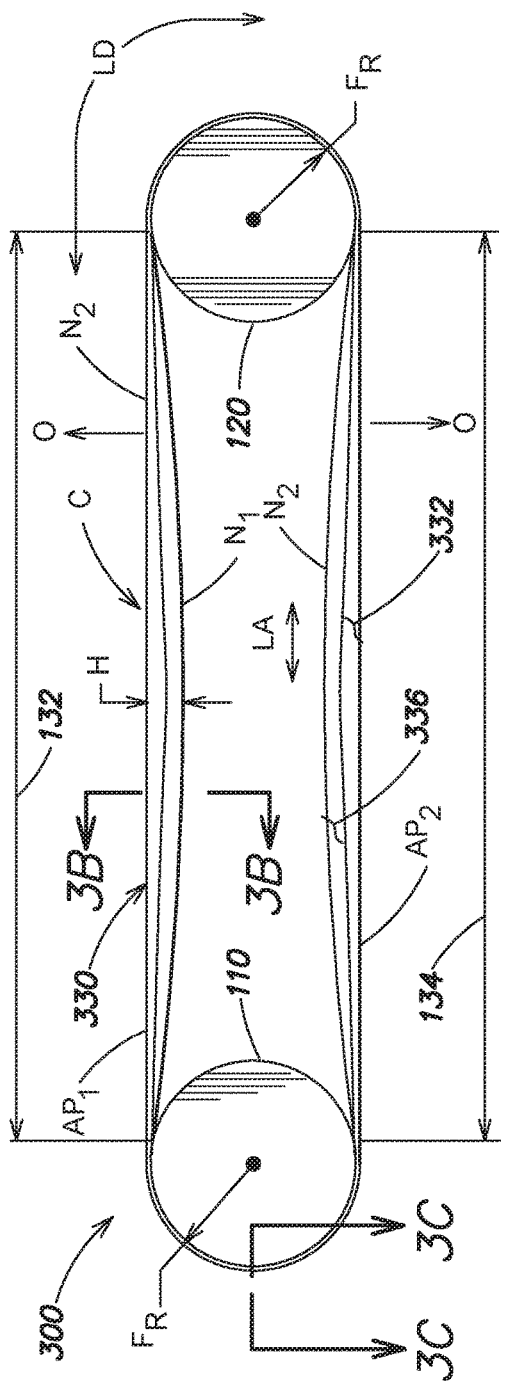
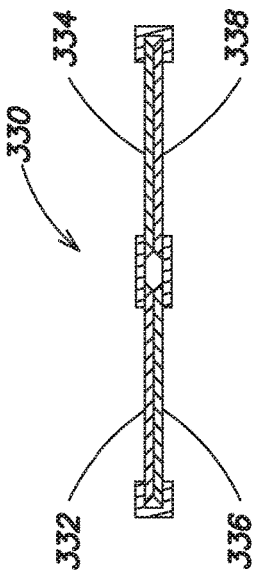
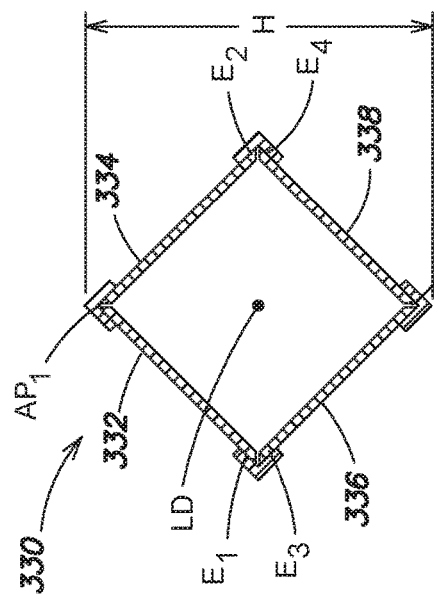
FIG. 3A
FIG. 3B
FIG. 3C

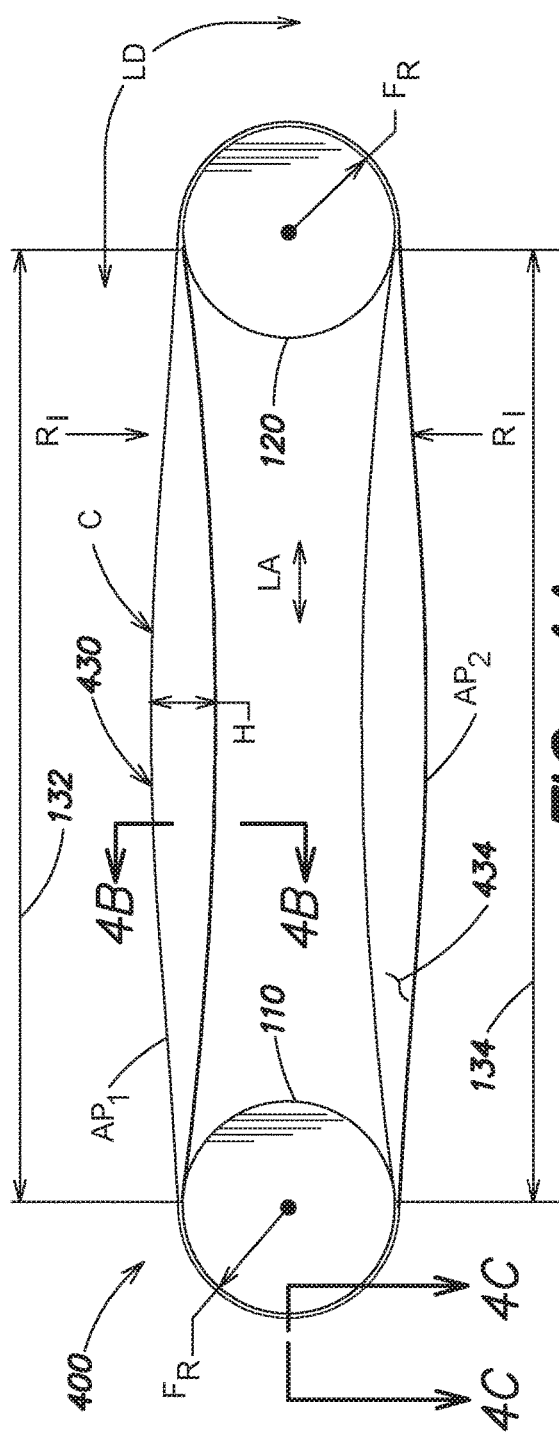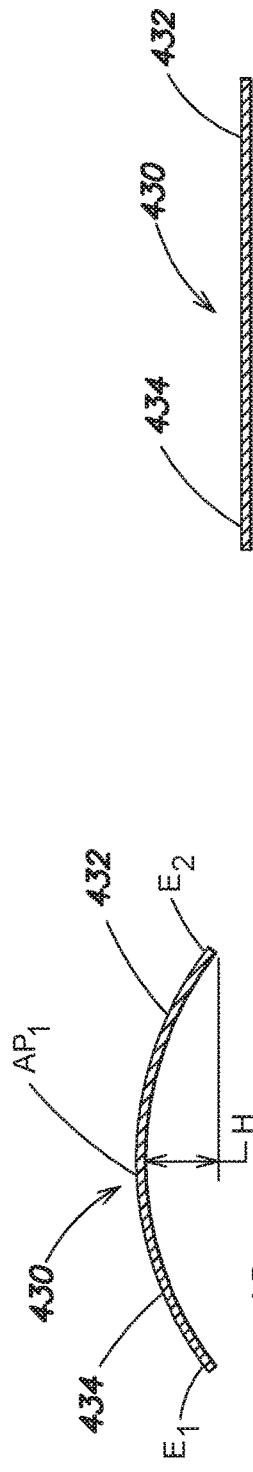
FIG. 4A
FIG. 4B
FIG. 4C

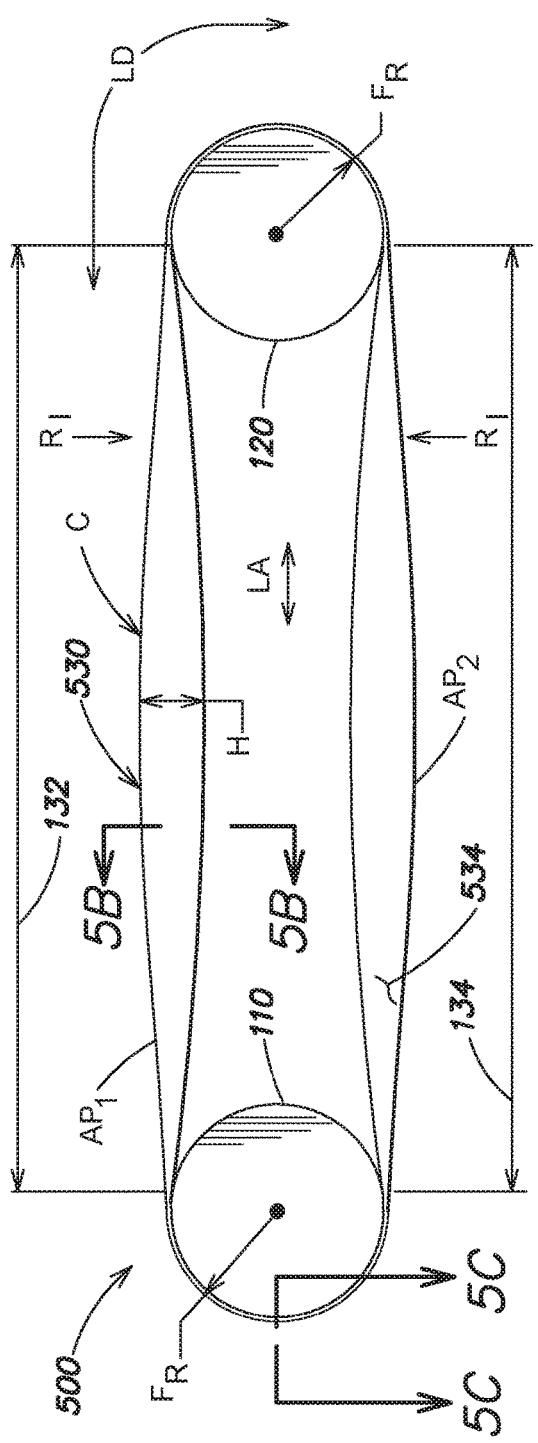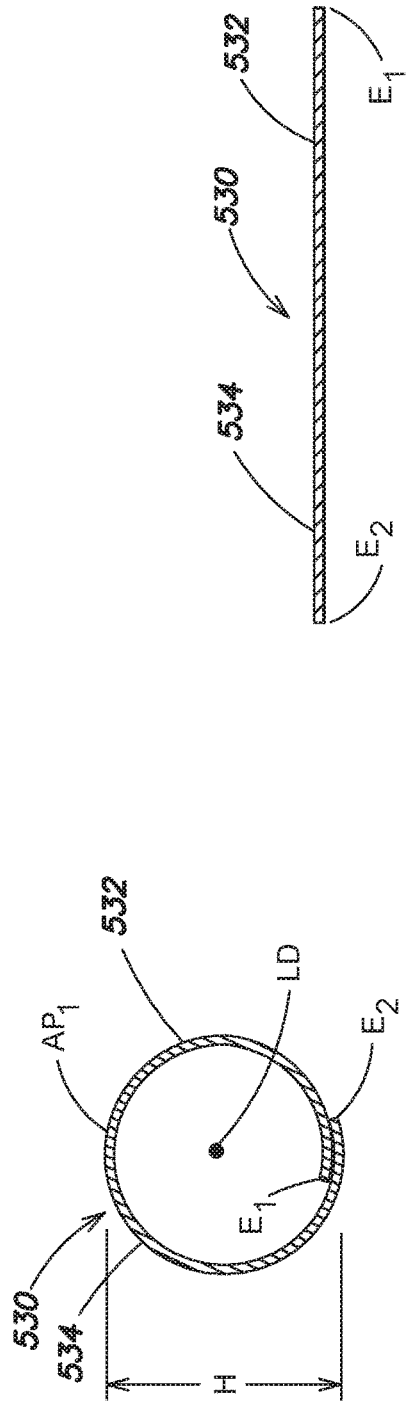
FIG. 5A
FIG. 5B
FIG. 5C

BELT CONFIGURED TO INCLUDE RIGID PORTIONS

FIELD OF THE INVENTION

A belt configured to include rigid portions and systems such as conveyors, tracks, timing belts, and drive mechanisms including such a belt.

BACKGROUND OF THE INVENTION

Drive mechanisms including a first wheel, a second wheel and a belt extending around the wheels are known. In such mechanisms, the belt is pulled by the first wheel (i.e., the drive wheel) when the first wheel is rotated about a first shaft (also referred to as a first axle), for example, by a motor or other power source. The belt, as it is pulled by the first wheel, in turn, pulls the second wheel which rotates about a second shaft (also referred to as a second axle).

In such mechanisms, the belt is in tension as it travels from the second wheel toward the first wheel; and the belt is in a relatively slack state as it travels from the first wheel toward the second wheel. The presence of a portion of the belt that is in a slack state results in inefficient transfer of power from the first wheel to the second wheel, and also results in the first wheel and the second wheel forming an unbalanced system, with unbalanced forces exerted on the wheels and shafts.

BRIEF SUMMARY OF THE INVENTION

Aspects of the invention are directed to a belt system, comprising a belt forming a closed shape that defines a circumference in a longitudinal direction. The belt has a first rigid portion and a second rigid portion. The first rigid portion and the second rigid portion are separated from one another around the circumference.

Other aspects of the invention are directed to a drive mechanism, comprising a first wheel having a first axis of rotation, and a second wheel having a second axis of rotation, and a belt having a longitudinal direction extending around the first wheel and the second wheel and forming a closed shape with a circumference in the longitudinal direction. The belt has a first rigid portion and a second rigid portion each extending from the first wheel to the second wheel, the first rigid portion and the second portion being at distinct locations around the circumference, the belt being coupled to each of the first wheel and the second wheel. Accordingly, when the first wheel is rotated about its axis of rotation the rotation causes movement of the belt along the longitudinal direction such that the first rigid portion provides a pushing force on the second wheel, and the second rigid portion provides a pulling force on the second wheel.

In some embodiments, the belt is constructed such that, in an unstressed state, it has a stadium shape. The drive mechanism may constitute a conveyor or a track as on a tracked vehicle.

In some embodiments the belt, in an unstressed state, has a circular shape. The drive mechanism may constitute a track.

In some embodiments, having a longitudinal axis extending perpendicular to the first axis and the second axis, the first wheel and the second wheel define a longitudinal extent in the direction of the longitudinal axis. The belt has an interior surface that extends further in the direction of the longitudinal axis than the longitudinal extent, at at least one of the first wheel and the second wheel. Accordingly, a gap is present between the belt and the at least one of the first wheel and the second wheel.

In some embodiments, the belt is a multilayer belt.

In some embodiments, the belt comprises a first side, and a second side coupled to the first side. Each of the first side and the second side extends around the entire circumference. The first side and the second side are coupled together around the circumference to form a first apex along the first rigid portion and a second apex along the second rigid portion. At each of the first rigid portion and the second rigid portion, each of the first side and the second side extending inward relative to the circumference from a respective one of the first apex and the second apex. The coupling permits rotation of first side and second side about the first apex and the second apex, whereby when the belt passes over one of the first wheel and the second wheel the belt can flatten.

The first side and the second side may be configured such that the belt has a V-shaped cross section along the first rigid portion and along the second rigid portion.

In some embodiments, the belt further comprises a third side, and a fourth side coupled to the third side, each of the third side and the fourth side extending around the entire circumference. The third side and the fourth side are coupled together around the circumference to form a first nadir along the first rigid portion and a second nadir along the second rigid portion. At each of the first rigid portion and the second rigid portion, each of the third side and the fourth side extending outward relative to the circumference, from a respective one of the first nadir and the second nadir. The coupling permits rotation of third side and fourth side about the first nadir and the second nadir. The first side has an outer edge relative to first apex and the second apex, and the third side has an outer edge relative to the first nadir and the second nadir. The outer edge of the first side and the outer edge of the third side are coupled together. The second side having an outer edge relative to the first apex and the second apex and the fourth side having an outer edge relative to the first nadir and the second nadir. The outer edge of the second side and the outer edge of the fourth side are coupled together. Accordingly, between the first wheel and the second wheel, the belt has a quadrilateral cross section, and when the belt passes over one of the first wheel and the second wheel the belt can flatten.

In some embodiments, the belt has a channel-shaped cross-section. The cross-section may be arcuate. In some embodiments, the belt has a tubular cross section with a cut extending along the longitudinal direction to form longitudinally-extending edges. The edges may overlap along the longitudinal direction.

In some embodiments, the belt comprises at least two belt layers, the layers disposed at different radial distances than one another, relative to the closed shape.

In some embodiments, each belt layer has a corresponding interior surface and a corresponding exterior surface. The exterior surface of each layer defines a corresponding layer longitudinal-extent. The interior surface of at least one of the layers extends further than the longitudinal extent of the exterior surface of its interiorly-adjacent layer, thereby forming a gap between the at least one of the layers and its interiorly adjacent layer.

In some embodiments, the belt has a first edge and a second edge in a direction transverse to the longitudinal direction. Each layer has a respective first edge and second edge in a direction transverse to the longitudinal axis, each first edge of each of the layers being disposed at the belt first edge and each second edge of the layers being disposed at the belt second edge. Each layer has at its first edge a corresponding plurality of gear projection receptacles disposed around the circumference. The locations of the plurality of gear projection receptacles of each layer being aligned with the locations of the plurality of gear projection receptacles of the other layers around the circumference.

Aspects of the present invention are also directed to a belt forming a closed shape defining a circumference. Belts according to this aspect of the invention are capable of forming rigid portions as defined below. The belt comprises a first side, and a second side coupled to the first side, each of the first side and the second side extending around the entire circumference. The first side and the second side are coupled together around the circumference to form at least a first apex extending around the entire circumference. Each of the first side and the second side extend radially inward (i.e., toward the interior of the closed shape) relative to the circumference, from the first apex. The coupling permits rotation of first side and second side about the first apex and the second apex. It will be appreciated that a belt not coupled to the wheels of drive system may not be flattened as it would be in an embodiments where the belt is wrapped around wheels or otherwise stressed during use so that the belt may have only a single apex extending around the circumference. Belts according to these aspects of the present invention may have any features as described herein with reference to a belt in a drive system including, for example, a belt as described in any of FIGS. 2A-5C.

In some embodiments of belts, the belt further comprises a third side, and a fourth side coupled to the third side, each of the third side and the fourth side extending around the entire circumference. The third side and the fourth side are coupled together around the circumference to form a first nadir. Each of the third side and the fourth side extending outward relative to the circumference (toward the exterior of the closed shape), from the first nadir. The coupling permits rotation of third side and fourth side about the first nadir. The first side has an outer edge relative to first apex, and the third side has an outer edge relative to the first nadir. The outer edge of the first side and the outer edge of the third side are coupled together. The second side has an outer edge relative to the first apex and the fourth side has an outer edge relative to the first nadir, the outer edge of the second side and the outer edge of the fourth side being coupled together. Accordingly, the belt has a quadrilateral cross section. It will be appreciated that a belt not coupled to the wheels of drive system may not be flattened as it would be at the wheels so that the belt may have only a single nadir extending around the circumference. Belts according to aspects of the present invention may have any features as described herein with reference to a belt in a drive system including, for example, a belt as described in any of FIGS. 3A-3C Still further aspects of the invention are directed to a belt forming a closed shape. In some embodiments the belt, when in an unflexed state (e.g., not stressed by a wheel in a drive system), may have a channel-shaped cross-section, a v-shaped cross-section or a quadrilateral cross-section, the belt comprises at least two belt layers, the layers disposed at different radial distances than one another at a given location along the circumference, relative to the closed shape.

In some embodiments, each belt layer has a corresponding interior surface and a corresponding exterior surface, the exterior surface of each layer defining a corresponding layer, longitudinal extent. The interior surface of at least one of the layers extends further than the layer longitudinal extent of the exterior surface of its interiorly-adjacent layer. Accordingly, a gap is present between the at least one of the layers and its interiorly adjacent layer.

In some embodiments, the belt has a longitudinal direction and a first edge and a second edge in a direction transverse to the longitudinal direction. Each layer has a respective first edge and second edge in a direction transverse to the longitudinal axis. Each first edge of the at least two layers is formed at the belt first edge and each second edge of the at least two layers is formed at the belt second edge. Each layer of the at least two layers has at its first edge a plurality of gear projection receptacles disposed around the circumference. The at least two layers are configured such that, when the belt is attached to a drive system having a gear with a plurality of projections, a given gear projection of the plurality of projections can extend into one of the plurality of receptacles of each of the layers at a given time.

As defined herein the term "rigid" as applied to a belt means having a portion capable of supporting an axial load (i.e., a load applying a force in the direction of the belt's length, also referred to herein as the belt longitudinal direction) without axial compression, and the portion capable of acting like a beam by resisting a load perpendicular to the belt length. A rigid belt may only support a load in one direction (i.e., radially inward, toward an interior of a belt forming a closed shape) and not in a direction opposite to that direction (i.e., radially outward).

For example, rigidity can be observed for a structure having a cross section similar to a channel-shaped belt as described with reference to FIG. 4A using a conventional, retractable, spring steel, measuring tape, and observing its resistance to axial force and resistance to a force perpendicular to its length. The force perpendicular to the length is applied downward on the convex surface when the tape is supported from below at the two ends with the concave surface facing down (for example resting on a person's knees such that the tape extends between the knees) and applying the force between the two supports. It will be observed the tape resists the force in the manner of steel beam. It will be appreciated that, similar to beam structures, the tape will buckle or fail if a force is too great.

As defined herein the term "channel" means a duct having an interior that is at least partially hollow and a cross-section that is a non-closed figure with non-overlapping edges (e.g., see FIG. 4A-4B) or a non-closed figure with overlapping edges (e.g., see FIG. 5A-5B).

As defined herein the term "channel-shaped cross-section" means having a cross section of a channel. For example, a partial pipe that is at least partially hollow within is channel-shaped. A channel-shaped cross-section may have a shape of a portion of a circle (i.e., an arc) or another at least partially hollow shape. For example, a belt having a channel-shaped cross section may be formed by rolling a sheet of material around a longitudinal axis and connecting the longitudinal edges (i.e., edges that define the sheet length) together. The sheet of material may have a uniform thickness or a non-uniform thickness.

As defined herein the term "belt" means an endless strip of material or a strip of material whose longitudinal ends are connected together.

As defined herein the term "track" means a belt on which a vehicle travels.

BRIEF DESCRIPTION OF THE SEVERAL VIEWS OF THE DRAWING

The nature and mode of operation of the present invention will now be more fully described in the following detailed description of the invention taken with the accompanying drawing figures, in which:

FIG. 1A is a schematic side view illustration of an example of a drive mechanism including a belt having rigid portions according to aspects of the present invention;

FIG. 1B is a schematic top view illustration of the drive mechanism of FIG. 1A;

FIG. 2A shows a side view of an example of an embodiment of a drive mechanism as shown in FIG. 1 including a belt having a V-shaped cross-section;

FIG. 2B shows a cross-section view of an unflexed portion of the belt of FIG. 2A;

FIG. 2C shows a cross-section view of a portion of the belt of FIG. 2A flexed to achieve a flattened state, such as occurs when a portion is stressed as it passes a wheel of the drive mechanism;

FIG. 3A shows a side view of an example of an embodiment of a drive mechanism as shown in FIG. 1 including a belt having a quadrilateral-shaped cross-section;

FIG. 3B shows a cross-section view of an unflexed portion of the belt of FIG. 3A;

FIG. 3C shows a cross-section view of a portion of the belt of FIG. 3A flexed to achieve a flattened state, such as occurs when the portion is stressed as it passes a wheel of the drive mechanism;

FIG. 4A shows a side view of an example of an embodiment of a drive mechanism as shown in FIG. 1 including a belt having a channel-shaped cross-section where the edges of the belt that are disposed transverse to the longitudinal direction of the belt do not overlap when the belt is in an unflexed state;

FIG. 4B shows a cross-section view of an unflexed portion of the belt of FIG. 4A;

FIG. 4C shows a cross-section view of a portion of the belt of FIG. 4A stressed to achieve a flattened state, such as occurs when the portion is stressed as it passes a wheel of the drive mechanism;

FIG. 5A shows a side view of an example of an embodiment of a drive mechanism as shown in FIG. 1 including a belt having a channel-shaped cross-section where the edges of the belt when the belt is in an unflexed state overlap;

FIG. 5B shows a cross-section view of an unflexed portion of the belt of FIG. 5A;

FIG. 5C shows a cross-section view of a portion of the belt of FIG. 5A flexed to achieve a flattened state, such as occurs when the portion is stressed as it passes a wheel of the drive mechanism;

DETAILED DESCRIPTION OF THE INVENTION

Figure 6:
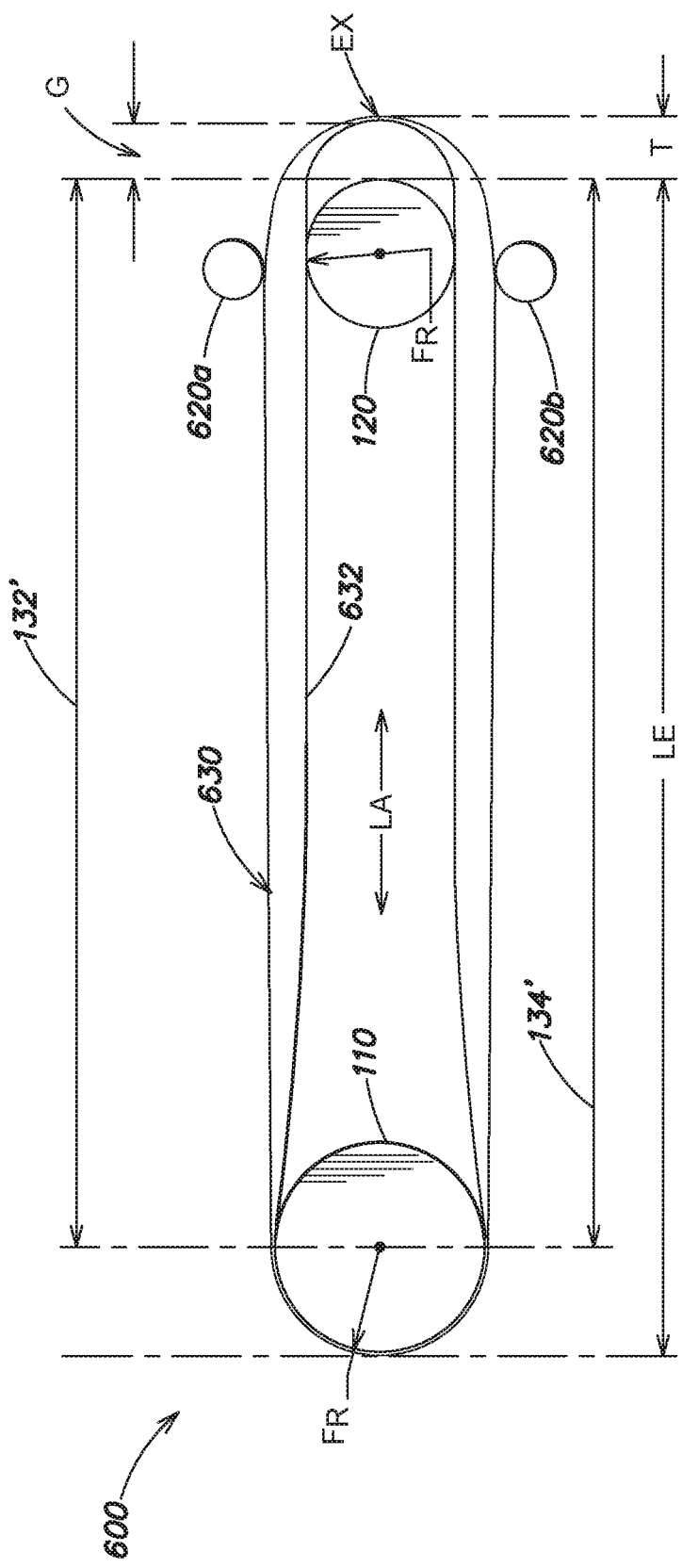
FIG. 6 is a schematic illustration of another example of a drive mechanism including a belt having rigid portions according to aspects of the present invention, in which a gap is present between a wheel of the drive mechanism and an extremity of the belt.

A first aspect of the invention is directed to a drive mechanism including a first wheel and a second wheel, and a belt having a circumference, the belt extending around each of the wheels. The belt is configured such that a first rigid portion of the belt and a second rigid portion of the belt are formed between the first wheel and the second wheel such that each of the first rigid portion and the second rigid portion contact, both, the first wheel and the second wheel. As discussed below, the rigid portions may extend beyond (e.g., toward an end of a stadium shaped belt) where the belt makes contact with the first wheel and/or the second wheel. The first rigid portion is present at a first location on the circumference of the belt that is traveling from the first wheel toward the second wheel, and the second rigid portion is present at a second location on the circumference of the belt that is traveling from the second wheel toward the first wheel. Accordingly, the belt is capable of transferring force that is generated by rotating the first wheel to the second wheel, both, by using the first portion of the belt to push the second wheel and using the second portion of the belt to pull the second wheel.

FIGS. 1A and 1B are side and top view schematic illustrations of an example of an embodiment of a drive mechanism 100 having a belt 130 according to the above aspects of the present invention. Drive mechanism 100 comprises a first wheel 110 having a first axis of rotation $A_1$, a second wheel 120 having a second axis of rotation $A_2$, and belt 130 having a longitudinal direction LD between the first wheel 110 and the second wheel 120, and extending around the first wheel and the second wheel. The belt forms a closed shape with a circumference C in the longitudinal direction LD of the belt (i.e., extending along the direction LD).

Typically, the longitudinal direction LD of the belt is aligned with the longitudinal axis LA of the drive mechanism over a majority of the belt length (i.e., the portions that extend between wheel 110 and wheel 120); however, for example, if one of the wheels is rotated such that the axes $A_1$ and $A_2$ are not parallel, the direction LD may not be aligned with axis LA. For example, in embodiments where the belt is a track, rotating a wheel about axis LA such that axes $A_1$ and $A_2$ are not parallel can be used to turn a vehicle traveling on the track.

Belt 130 has a first rigid portion 132 and a second rigid portion 134 each extend from first wheel 110 to second wheel 120. The first rigid portion and the second portion exist at distinct locations around circumference C (i.e., non-rigid, flexed portions at wheels 110 and 120 disposed between the rigid portions). As discussed in greater detail below with reference to FIGS. 2A-5C and 8A-8C, belt 130 is configured such that in the absence of a radial force $F_R$ from a wheel 110, 120, belt 130 achieves a particular cross sectional shape and, in the presence of radial force $F_R$ from a wheel 110, 120, the cross-section is flattened in the radial direction as compared to the state in the absence of the radial force. Furthermore, the cross section, in the absence of the radial force (i.e., at a location between first wheel 110 and the second wheel 120), allows the belt to be rigid. At locations where the belt is in contact with a wheel 110, 120, radial force $F_R$ is applied to the belt and the belt is flattened. When the belt is flattened, the belt is not rigid allowing the belt to rotate around the wheel 110, 120. It is to be appreciated that portions of the belt contacting the wheels (i.e., where the belt first makes contact with a wheel or where the belt is about to leave contact with a wheel) may not be completely flat, and may or may not be rigid. Although a given rigid portion 132, 134 contacts both wheels so as to be able to transfer force therebetween, the rigid portions may or may not extend past the locations where contact is made with the wheels 110, 120. The portions of the belt that are bent during rotation around a wheel are non-rigid but may retain a spring-like resilience due the properties of the material used to construct the belt. Examples of suitable materials for achieving resilience are discussed below with reference FIG. 10.

The presence of rigid portions may be determined in situ (e.g., with a belt extending between wheels 110 and 120) by observing the belt in operation or by applying forces to the belt to determine its ability to support an axial load and to resist a load applied perpendicular to its length in the manner of a beam. Alternatively, a belt may be tested when it is removed from its apparatus with the belt configured to reproduce its condition when it is in use.

Figure 7:
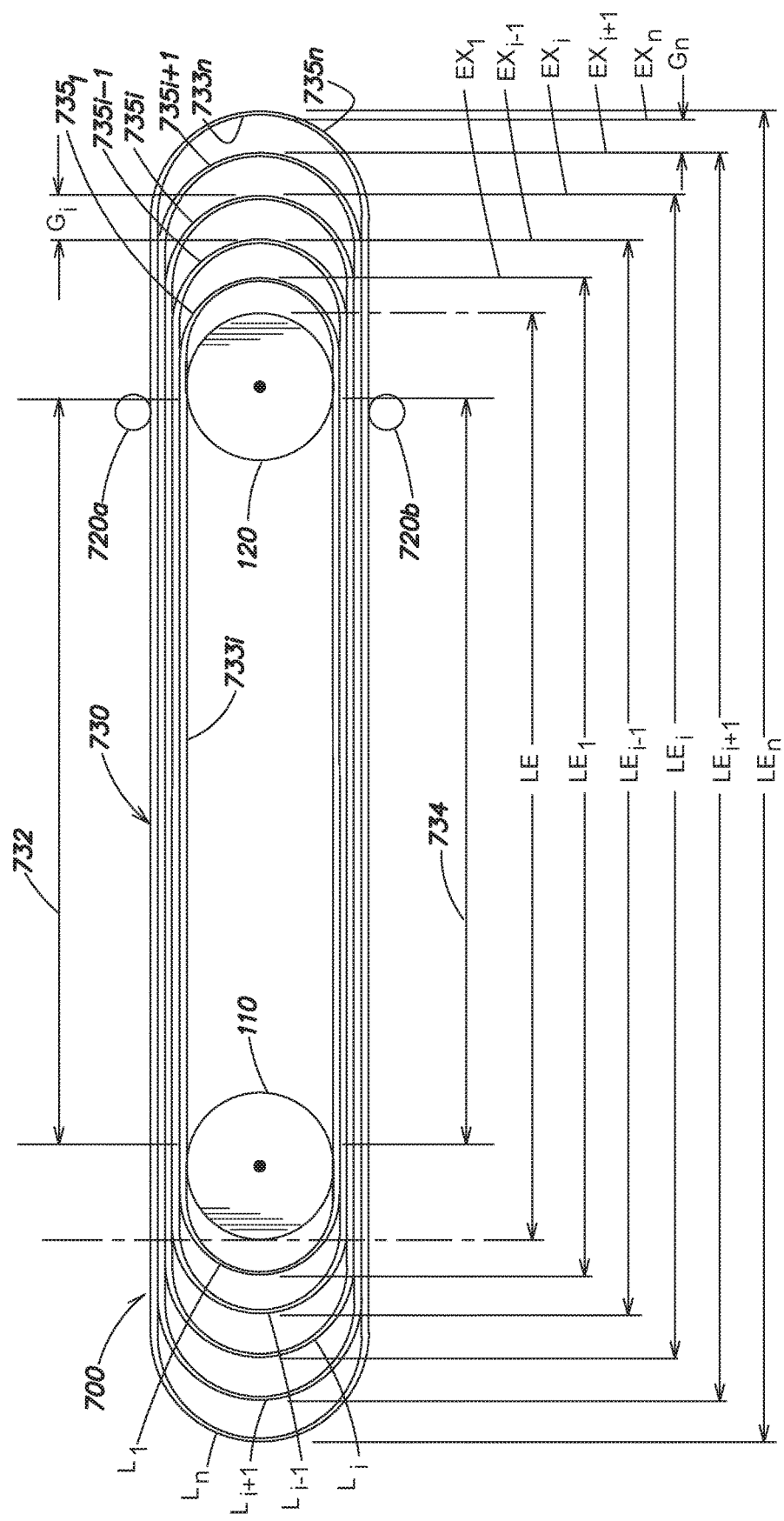
FIG. 7 is a schematic illustration of another example of a drive mechanism including a multilayer belt having rigid portions according to aspects of the present invention in which an interior surface of at least one of the layers extends further than the longitudinal extent of the exterior surface of its interiorly-adjacent layer to form a gap therebetween.

A belt is rigid because of its structure (v-shape, channel, quadrilateral) and the belt has the property of rigidness even when removed from a drive mechanism. However, tension forces from the wheels (caused by the wheels exerting outward forces on the belt along the longitudinal axis LA) may enhance the rigidity of a belt when in place between wheels. As shown in FIG. 1B, the wheels can enhance tension in the edges of the belt and compression along the apex, adding to the rigidity of the rigid portions of the belt. Belt 730, as shown in FIG. 7, comprises multiple layers (each having a flat, v-shaped or channel-shaped cross-section) to add to the rigidity of first rigid portion 132 and second rigid portion 134 using multiple layers which separate from one another as they turn around wheels 110,120.

It will also be appreciated that, because portion 132 and portion 134 of the belt are rigid, when first wheel 110 is rotated about its axis of rotation $A_1$, the rotation causes movement of belt 130 along the longitudinal direction LD such that the first rigid portion provides a pushing force $F_{push}$ on the second wheel, and the second rigid portion provides a pulling force $F_{pull}$ on the second wheel. Belt 130 may be coupled to each of first wheel 110 and second wheel 120 in any suitable manner that permits transfer of force from the first wheel to the belt, and transfer of force from the belt to the second wheel. In some embodiments, the coupling is by direct contact between the belt and the wheel, but indirect coupling may be possible, for example, with the belt contacting an intermediate wheel or set or wheels, or an intermediate bearing or set of bearings, disposed between belt 130 and at least one of wheel 110, 120, to transfer power from belt 130 to at least one of wheel 110 and wheel 120.

Figure 8A:
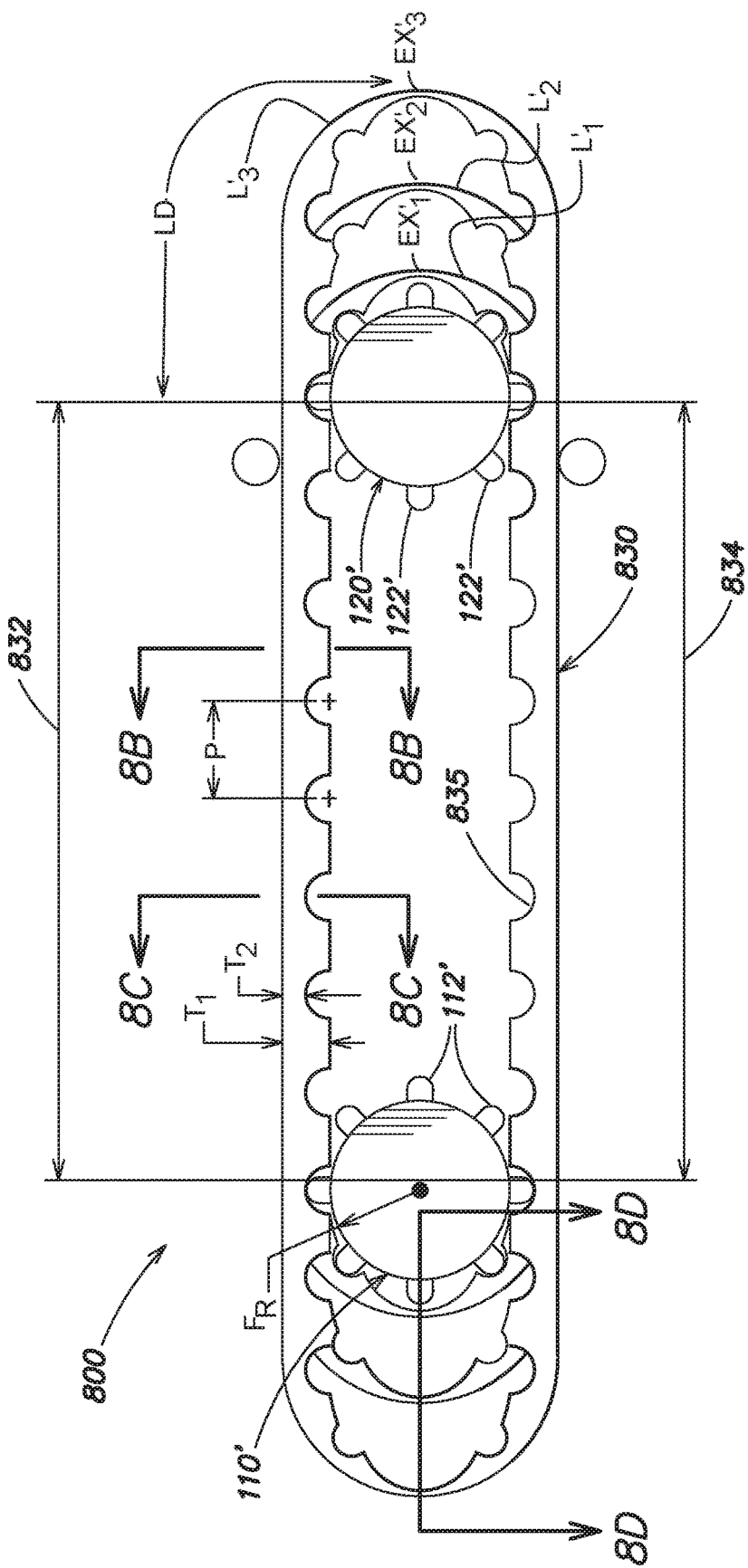
FIG. 8A is a schematic illustration of another example of a drive mechanism including a multilayer belt, in which the wheels are gears.

Wheel 110 and wheel 120 may have any suitable configuration to receive or transmit forces of belt 130. For example, wheels 110, 120 may each be configured as a pulley with a grooved, flat or other suitable shape on its rim to interface with belt 130. Wheel 110 and/or wheel 120 may also be configured as a sprocket or gear with one or more projections (not shown in FIG. 1A) extending from the wheel and one or more corresponding holes or concavities on the belt to operate as projection receptacles. Furthermore, although only a single wheel 110 or 120 is shown at a given end of the rigid portions 132, 134, one or more wheels can be present to provide power to the belt (i.e., operate as a drive wheel) or receive power from the belt. In embodiments having more than one wheel at an end, the wheels at the end may have the same or different sizes as one another. As used herein the terms "gear" and "sprocket" are used to refer to apparatus having a same structure as one another, and differ only in their use. The projections of a sprocket extend entirely through a belt in a direction transverse to the widest planar surface of the belt. The projections of a gear used in a manner where the projections are used other than as described for a sprocket, for example, the projections extend in a direction transverse to the widest planar surface of a belt as shown in the embodiment of FIG. 8A.

Referring to FIGS. 1A and 1B, belt 130 may be made of any suitable material that is strong enough to attain its intended longitudinal and cross-sectional shapes, and perform its intended purpose (e.g., as a conveyor or a track or a drive belt), flexible enough to attain a flattened state when passing by a wheel 110, 120, and resilient enough to re-attain its cross-sectional shape when the stress of passing a wheel 110, 120 is removed. For example, the belt may be made of a plastic (e.g., polypropylene, polyethylene, plastic reinforced with fiberglass), a metallic material such as spring steel or a shape-memory material. Belt 130, wheel 110, and/or wheel 120 may be textured or coated to enhance friction between the wheel(s) and belt to aid in the transfer of the pulling and/or pushing forces. Also, in embodiments where the belt is a track, texture or a tread may be added to the outer surface of the belt to facilitate traction with a surface on which the track is to travel. Cross-sectional dimensions of belts can vary greatly depending on the shape of the belt, the material used and intended application of the belt. Channel-shaped belts as shown in FIGS. 4A-4C could be made with cross-sectional dimensions similar to those of conventional retractable tape measures or with any other suitable dimensions.

Belt 130, in an unstressed state (i.e., when removed from the drive system and without a deforming force from a wheel or pulley), may have a stadium shape, a circular shape or any other suitable shape. A stadium shape refers to a closed shape where the ends are rounded and straight sections extend between the ends. Belts having a stadium shape lend themselves, for example, to embodiments where the drive mechanism is to be configured as a conveyor to move a load that is present on a flat section of the belt between the wheels (typically on the outside of the belt) or to embodiments where the drive mechanism is to be configured as a track on a vehicle to move along the ground or other surface. Belts having a circular shape lend themselves, for example, to embodiments where the drive mechanism is to be configured as a track that operates as a wheel. Wheel embodiments are discussed below, in greater detail, with reference to FIG. 9A-9D.

A force to rotate wheel 110 (i.e., the drive wheel) about axis $A_1$ may be generated, for example, by a motor 150 or other power source that rotates an axle 160 of wheel 110. A drive system transfers force from a first wheel (e.g., wheel 110) to a second wheel (e.g. wheel 120). A drive system may or may not include a motor.

Drive mechanisms as described above have many uses such as conveyors, tracks, timing belts, drive mechanisms, belt sanders, power rasps, treadmills to name a few. In embodiments where the wheels have sprockets and the belts have holes, the holes can be used as a timing mechanism. For example, circular belts are useful in embodiments where the belt is to operate as a wheel, as discussed in greater detail with reference to FIGS. 9A-9D below.

The following discussion provides examples and further details regarding belts suitable for use with drive mechanisms as described above. Some embodiments of belts that are suitable for use with a drive mechanism as described above comprise a first side, and a second side coupled to the first side. Examples of embodiments of such belts are described below with reference to FIGS. 2A-5C. In such embodiments, each of the first side and the second side extend around the entire circumference C of the belt. The first side and the second side are coupled together around the circumference C and form a first apex between the first wheel and the second wheel (i.e., along the first rigid portion) and a second apex between a first wheel and a second wheel (i.e., along the second rigid portion).

At each of the first rigid portion and the second rigid portion, each of the first side and the second side extend radially inward (in a direction $R_I$) relative to the circumference C thereby forming the first apex and the second apex.

The coupling permits rotation of the first side and the second side about the respective one of the first apex and the second apex whereby, when the belt passes over one of the first wheel and the second wheel, the belt flattens in response to a radial force from the one of the wheels.

Although the illustrated embodiments show two rigid portions, it is to be appreciated that in some systems, a single belt can have three or greater rigid portions, each rigid portion separated from other rigid portions by a non-rigid portion. For example, each non-rigid portion can be generated by radial forces from an additional wheel or other object capable of generating radial forces on the belt in the manner described above.

As described in greater detail below with reference to FIG. 10-12, although embodiments described above have a wheel (or at least one wheel) at each end of the belt (on the interior side of the belt), according to aspects of the invention, all wheels can be eliminated from the interior side of the belt at one or both of the ends. It is to be appreciated, that due to the rigidity of the belt, the belt can be made to proceed around an end at a given radius from a center of rotation (as if a wheel of the given radius were present). In some embodiments, one or more idler pulleys of other belt shaping structures may be used to maintain the stability of the belt around the end. A drive system having such a configuration (i.e., without a wheel of the given radius) at an end is referred to as having a virtual wheel.

FIG. 2A shows a side view of an example of an embodiment of a drive system 200 (similar to the drive system of FIG. 1A) including a belt 230 having a first side 232 and a second side 234 (visible in FIG. 2B) as described above. Belt 230 has a V-shaped cross-section when in an unflexed state. FIG. 2B shows a cross-section view of an unflexed portion of the belt of FIG. 2A shown along lines 2B-2B. FIG. 2C shows a cross-section view of a portion of the belt of FIG. 2A shown along lines 2C-2C stressed by a radial force from wheel 110 to achieve a flattened state, such as occurs when a portion passes of belt 130 passes wheel 110 of the drive mechanism.

Referring to FIGS. 2A-2C, second side 234 is coupled to first side 232. First side 232 and second side 234 each extend around the entire circumference C of belt 230.

First side 232 and second side 234 are coupled together around circumference C. For example, first side 232 and second side 234 can be coupled together using a flexible tape 235 extending along the longitudinal direction LD. The tape may extend continuously along the entire circumference C or with one or more gaps (not shown) along the circumference. For example, tape 235 can comprise polyurethane, a polypropylene (e.g., made of a material similar to those used in a living hinge), a shape memory material, rubber or a combination thereof. Alternatively, the first side and the second side may be held together by stitching the sides together with spring(s) or otherwise held in a v-shape by spring(s) such that the belt can flex to a flat state when a radial force is applied to the belt, and return to v-shape after the force is removed. Each side 432, 434 may be configured as a single sheet of material (e.g., a plastic such as polypropylene or polyethylene, plastic reinforced with fiber glass, a metallic material such as spring steel, or a shape-memory material) having a unitary construction.

First side 232 and second side 234 form a first apex $AP_1$ where the first side and the second side are coupled together, at locations between first wheel 110 and second wheel 120 (i.e., along first rigid portion 132). First side 232 and second side 234 form a second apex $AP_2$ where the first side and the second side are coupled together, at locations between first wheel 110 and second wheel 120 (i.e., along second rigid portion 134). At each of the first rigid portion and the second rigid portion, each of first side 232 and the second side 234 extend inward relative to circumference C in a direction $R_1$. At the first rigid portion, the first side and the second side extend from first apex $AP_1$ and at the second rigid portion, the first side and the second side extend from second apex $AP_2$.

The coupling together of first side 232 and second side 234 permits rotation of first side 232 and second side 234 about first apex $AP_1$ and second apex $AP_2$ as a radial force $F_R$ is applied to belt 230 by each of first wheel 110 and second wheel 120. Typically, for the portion of the belt contacting the wheel 110, 120, the entire first side 232 and the entire second side 234 each pivot about first apex and the second apex. As a result of the rotation of the sides about the apices, when belt 230 passes over one of first wheel 110 and second wheel 120, belt 230 flattens and the belt is no longer rigid. After passing over a wheel 110, 120, the resilience of belt 230 (e.g., tape 235 or one or more springs) causes the belt to re-attain its V-shape and the belt re-attains its rigid properties. Idler pulleys or other shaping structures can be provided proximate locations where the belt contacts wheels 110, 120 to provide a force on the belt to re-attain the V-shape.

FIG. 3A shows a side view of an example of an embodiment of a drive system 300 (similar to the drive system of FIG. 1A) including a belt 330 having a first side 332 and a second side 334, as well as a third side 336 and a fourth side 338 (visible in FIG. 3B). Belt 330 has a quadrilateral-shaped cross-section when unflexed. FIG. 3B shows a cross-section view of an unflexed portion of the belt of FIG. 3A shown along lines 3B-3B between wheels 110 and 120. FIG. 3C shows a cross-section view of a portion of the belt of FIG. 3A shown along lines 3C-3C stressed to achieve a flattened state, such as occurs when a portion of belt 330 passes wheel 110 of the drive mechanism.

Second side 334 is coupled to first side 332 and sides 332, 334 are configured in the manner of belt 200 discussed above with reference to FIGS. 2A-2C. Belt 330 further comprises a third side 336, and a fourth side 338 coupled to third side 336. Similar to sides 332 and 334, each of third side 336 and fourth side 338 extend around the entire circumference C.

Third side 336 and fourth side 338 are coupled together (e.g., using a flexible and resilient tape or springs as described above) around circumference C to form a first nadir $N_1$ between first wheel 110 and second wheel 120 (i.e., along first rigid portion 132) and a second nadir $N_2$ between first wheel 110 and second wheel 120 (i.e., along second rigid portion 134). At each of first rigid portion 132 and second rigid portion 134, each of third side 336 and fourth side 338 extend radially outward relative to circumference C (in a direction O). At the first rigid portion, the third side and the fourth side extend from first nadir $N_1$ and at the second rigid portion, the third side and the fourth side extend from second nadir $N_2$.

As described above with reference to first side 232 and second side 234 of FIGS. 2A-2C, the coupling of third side 336 and forth side 338 permits rotation of third side 336 and fourth side 338 about the first nadir $N_1$ and second nadir $N_2$ as radial force $F_R$ is applied to belt 330 by first wheel 110 and second wheel 120. Typically, for the portion of the belt contacting the wheel 110, 120, the entire third side 336 and the entire fourth side 338 each pivot about first nadir and the second nadir.

First side 332 has an outer edge $E_1$ relative to first apex $AP_1$ and second apex $AP_2$, and third side 336 has an outer edge $E_3$ relative to first nadir $N_1$ and second nadir $N_2$. Outer edge $E_1$ of first side 332 and outer edge $E_3$ of third side 336 are coupled together (e.g., using a flexible tape as described above) to permit rotation about the coupling location.

Second side 334 has an outer edge $E_2$ relative to first apex $AP_1$ and second apex $AP_2$ and fourth side 338 has an outer edge $E_4$ relative to first nadir $N_1$ and second nadir $N_2$. Outer edge $E_2$ of second side 334 and outer edge $E_4$ of fourth side 338 are coupled together around the circumference (e.g., using flexible tape or spring(s) as described above) to permit rotation about the coupling location.

Between first wheel 110 and second wheel 120, belt 330 has a quadrilateral cross section (shown in FIG. 3B), and as a result of radial forces $F_R$ and the rotation of sides 332, 334, 336, 338 about corresponding apices $AP_1$, $AP_2$ and $N_1$, $N_2$, when belt 330 passes over one of first wheel 110 and second wheel 120, the belt flattens and the belt is no longer rigid. The resulting structure is two layers thick. After passing over a wheel 110, 120, the resilience of belt 330 (e.g., flexible tape and/or spring(s)) causes the belt to re-attain its quadrilateral cross-sectional shape re-attaining its rigidity.

For example, the quadrilateral cross-sectional shape of belt 330 can be square or rhomboidal.

FIGS. 4A and 5A show examples of embodiments of drive systems each including a belt having a channel-shaped cross section when the belt is in an unstressed state.

FIG. 4A shows a side view of an example of an embodiment of a drive system 400 (similar to the drive system of FIG. 1A) including a belt 430. Belt 430 has a channel-shaped cross-sectional shape. FIG. 4B shows a cross-section view of an unflexed portion of belt 430 of FIG. 4A taken along lines 4B-4B where the cross section is an unclosed figure, the cross-section being arcuate. FIG. 4C shows a cross-section view of a portion of the belt of FIG. 4A taken along lines 4C-4C flexed to achieve a flattened state as occurs when a portion of belt 430 passes a wheel 110, 120 of the drive mechanism and a radial force $F_R$ is applied to the belt by the wheel.

Belt 430 comprises a first side 432, and a second side 434 that is coupled to first side 432. The belt 430, including first side 432 and second side 434 is configured as a single sheet of material (e.g., a plastic such as polypropylene or polyethylene, plastic reinforced with fiber glass, a metallic material such as spring steel, or a shape-memory material) having a unitary construction. The sheet of material, when in an unstressed state, is curled partially around longitudinal direction LD.

First side 432 and second side 434 form a first apex $AP_1$ between first wheel 110 and second wheel 120 (i.e., along first rigid portion 132) and a second apex $AP_2$ between first wheel 110 and second wheel 120 (i.e., along second rigid portion 134). At each of the first rigid portion and the second rigid portion, each of first side 432 and the second side 434 extend inward relative to circumference C (in a direction $R_1$). At the first rigid portion, the first side and second side extend from first apex $AP_1$ and at the second rigid portion, the first side and the second side extend from the second apex $AP_2$. The belt has a channel-shaped cross-section where the belt has edges $E_1$ and $E_2$ transverse to the longitudinal direction LA, where the edges do not overlap to form a tubular shape As a result of the unitary construction of belt 430 and the use of a flexible material, the coupling together of first side 432 and second side 434 permits rotation of first side 432 and second side 434 about first apex $AP_1$ and second apex $AP_2$ as radial force $F_R$ is applied to belt 430 by first wheel 110 and second wheel 120. As a result of the rotation about the apices, when belt 430 passes over one of first wheel 110 and second wheel 120, belt 430 flattens and is no longer rigid. After passing over a wheel 110, 120, the resilience of the material of belt 430 causes the belt to re-attain its channel-shaped cross-section and re-attaining its rigidity.

In some embodiments of a belt having a channel-shaped cross section, the cross-section is tubular (i.e., completely surrounds a line extending in the direction of longitudinal axis LA). FIG. 5A shows a side view of an example of an embodiment of a drive system 500 including a belt 530, the belt having a channel-shaped cross-section where the belt has edges $E_1'$ and $E_2$ transverse to the longitudinal direction LA, where the edges overlap to form a tubular shape. FIG. 5B shows a cross-section view of an unflexed portion of the belt of FIG. 5A taken along lines 5B-5B and showing the tubular cross section. FIG. 5C shows a cross-section view of a portion of the belt of FIG. 5A taken along lines 5C-5C flexed to achieve a flattened state having edges $E_1$, $E_2$ transverse to the longitudinal direction, as occurs when a portion of belt 500 is stressed as it passes a wheel 110, 120 of the drive mechanism and a radial force $F_R$ is applied to the belt by the wheel. Although in the illustrated embodiment of a belt edges $E_1$, $E_2$ overlap when a portion of the belt is in an unflexed state, in some embodiments of a belt with a tubular cross section, the edges $E_1$, $E_2$ may abut without overlapping and without being attached to one another.

Other than having a tubular cross-section as described above, belt 530 is similar to belt 430 comprising a first side 532, and a second side 534 that is coupled to first side 532 and configured as a sheet of material having a unitary construction. When in an unstressed state, belt 530 is curled completely around longitudinal direction LD at rigid portions 132, 134.

Also similar to belt 430, in belt 530 first side 532 and second side 534 form a first apex $AP_1$ between first wheel 110 and second wheel 120 (i.e., along first rigid portion 132) and a second apex $AP_2$ between first wheel 110 and second wheel 120 (i.e., along second rigid portion 134). At each of the first rigid portion and the second rigid portion, each of first side 532 and the second side 534 extend inward relative to circumference C (in a direction $R_I$). At the first rigid portion, the first side and the second side extend from the first apex $AP_1$ and at the second rigid portion, the first side and the second side extend from the second apex $AP_2$. Unlike belt 430, belt 530 has edges $E_1$ and $E_2$ of the sheet that also extend in a direction other than inward relative to circumference C (i.e., the edges curl around to form the tubular shape).

As a result of the unitary construction of belt 530 and the use of a flexible material, the coupling together of first side 532 and second side 534 permits rotation of first side 532 and second side 534 about first apex $AP_1$ and second apex $AP_2$ as radial force $F_R$ is applied to belt 530 by first wheel 110 and second wheel 120. As a result of the rotation about the apices, when belt 530 passes over one of first wheel 110 and second wheel 120, belt 530 flattens and is no longer rigid. After passing over a wheel 110, 120, the resilience of the material of belt 530 causes the belt to re-attain its channel-shaped, tubular cross-section and its rigidity.

FIG. 6 is a schematic illustration of another example of a drive mechanism 600 including a belt 630 having rigid portions 132' and 134' according to aspects of the present invention, in which a gap G is present between wheel 120 of the drive mechanism and an end of belt 630 (i.e., extremity EX).

In drive mechanism 600, first wheel 110 and second wheel 120 define a longitudinal extent LE. Belt 130 has an interior surface 632. Interior surface 632 extends further than longitudinal extent LE at second wheel 620 thereby forming gap G between belt 630 and second wheel 120.

It is to be appreciated that, in embodiments of drive mechanisms having a gap G, the belt may not be stressed enough in the radial direction (i.e., by radial force $F_R$) such that the belt cross-sectional shape is sufficiently flattened to cause the belt to attain a shape that where the belt fails to be rigid as it contacts and passes wheel 120 toward extremity EX. It will also be appreciated that, as a result, in embodiments of drive mechanisms having a gap, the belt may maintain its rigid property arising from the belt cross-sectional shape, beyond locations between wheels 110, 120 (i.e., in the illustrated embodiment, beyond wheel 120) and may extend past wheels 110, 120. In such embodiments, the stress of the turn T in proximity to extremity EX causes the cross section to flatten and lose its rigid property. Accordingly, the rigid portions 132' and 134' extend from wheel 110 to beyond wheel 120. The belt returns to its unstressed cross-sectional shape after sufficiently passing turn T, and may return to its rigid state prior to or when contacting wheel 120. In embodiments having a gap G, one or more idler pulleys 620a and 620b may be used to hold the belt in position relative to the wheels 110, 120.

It will be appreciated that, although only a gap between belt 630 and second wheel 120 is shown, interior surface 632 may extend further than longitudinal extent LE at one or both of first wheel 110 and second wheel 120. Accordingly, a gap may be present at the first wheel 110 and/or the second wheel 120. A belt having a second gap (not shown) at the first wheel 110 operates, at the second gap, in a manner similar to gap G at wheel 120.

Belt 630 may be configured as any belt described above with reference to FIGS. 2A-5C.

Other aspects of the invention are directed to a drive mechanism having wheels such as those described above, and having a belt comprising multiple layers. In embodiments of belts according to this aspect of the invention, a belt comprises at least two belt layers. At a given longitudinal location on the belt, the layers are disposed at different radial distances than one another, relative to the closed shape (e.g., relative to a point inside the closed shape). Multilayer belts have the advantage of providing strength and rigidity over what any single layer of the belt can provide.

It is to be appreciated that a multilayer belt has heretofore been unrealizable for use with a drive mechanism having wheels as described herein. They have been unrealizable due to the fact that, in a conventional multilayer belt where the layers are stacked on top of one another around the entire circumference of the belt, during rotation around a wheel, points on an outer layer must travel further than points on an inner layer. As a result, the layers are required to move (e.g., slide) relative to adjacent layers as the belt rotates around a wheel.

FIG. 7 is a schematic illustration of an example of a drive mechanism 700 having a multilayer belt 730 having a first rigid portion 732 and a second rigid portion 734 according to aspects of the present invention, in which a gap $G_i$ is present at a wheel 110, 120 of the drive mechanism, the gaps occur at an extremity EX of at least one layer of the belt and possibly, for all layers, at respective extremities $EX_1$, $EX_{i-1}$, $EX_i$, $EX_{i+1}$, $EX_n$. The designation i refers to an arbitrary layer, i−1 refers to an interiorly-adjacent layer, and i+1 refers to an exteriorly-adjacent layer.

Although five layers $L_i$ of belt 730 are shown, each layer having a gap at each wheel 110, 120, a belt according to these aspects of the invention may have two or more layers. The inner-most layer need not but may have a gap at either wheel 110, 120; however, typically, all layers other than the inner-most layer will have a gap at each wheel 110, 120.

As shown in FIG. 7, each belt layer $L_i$ has a corresponding interior surface $733_i$ and a corresponding exterior surface $735_i$. Exterior surface $735_i$ of each layer defines a corresponding longitudinal extent $LE_i$ for that layer (referred to herein as a "layer longitudinal extent"). According to some aspects of the invention, the interior surface $733_i$ of at least one of the layers extends further than the longitudinal extent $LE_{i-1}$ of the exterior surface $735_{i-1}$ of its interiorly adjacent layer $L_{i-1}$ (i.e., they are not in contact with one another). It will be appreciated that, as a result of this arrangement, a gap $G_i$ is formed between the at least one of the layers and its interiorly adjacent layer $L_{i-1}$. In the illustrated embodiment, each layer $L_i$, including the inner-most layer $L_1$, has a corresponding gap $G_i$. It will be appreciated that, as described above in FIG. 6, for the inner-most layer $L_1$ the gap $G_1$ is formed as a result of the interior surface $733_i$ of the inner-most layer $L_1$ extending further than the longitudinal extent LE formed by wheel 110 and wheel 120. As mentioned above, the inner-most layer may or may not have a gap $G_1$.

Along rigid portions 732 and 734 of belt 730 extending between wheels 110 and 120 where the belt moves without rotation about a wheel 110, 120, the layers $L_i$ remain in contact with neighboring layers $L_{i-1}$ and $L_{i+1}$ thereby retaining the enhanced rigidity provided by the multiple layers of the belt 730 to push and pull wheel 120 as wheel 110 is turned. It will also be appreciated that an inner-most layer $L_1$ and an outer-most layer $L_n$ contact only a single neighboring layer.

In some embodiments the layers may be magnetic, such that the layers may be held together to form a rigid portion 732, 734, by magnetic attraction or by surface tension of a liquid, such as a lubricating oil of sufficient viscosity that is provided on the interior and exterior surfaces of the layers. Idler wheels 720a, 720b may be present at one or more wheels 110, 120 to facilitate separation or uniting of layers of the belt As belt 730 moves around a wheel 110, 120, layers $L_1$-$L_n$ separate and travel different lengths corresponding to their respective gaps, thereby obviating the need for layers $L_1$-$L_n$ to slide relative to one another at portions of the belt where the layers are in contact with one another. Accordingly, sliding movement of the layers when they are in contact with one another can be eliminated or substantially reduced.

The layers of a multilayer belt may be flat or have a v-shaped or channel-shaped cross-section similar to the belts described above. Each layer moves in the manner described above with reference to FIGS. 2A-5C.

It will be appreciated that, for a given geometric design of the drive system (e.g., wheel size and wheel separation), a difference in gap sizes $G_i$ can be selected using geometry such that no or substantially reduced relative longitudinal movement between the layers occurs as the belt rotates. It will be appreciated that the gap at the first wheel 110 and the gap at the second wheel 120 for a given layer $L_i$ may be the same or may be different provided the sizes are selected to eliminate or substantially reduce relative movement of the layers.

In some embodiments, wheel 110 and/or wheel 120 is a sprocket. In such embodiments, it will be appreciated that the length of gaps $G_i$ for each layer Li is selected such that the holes in the belts align when they pass the projections of the sprockets thereby allowing each projection to pass through a hole in each of the belts. It will be appreciated that the distance between consecutive holes in the belt is typically uniform. In some embodiments of multilayer belts having holes, the gaps are formed by adding one or more additional (uniformly spaced) holes to a layer beyond the number of holes in the radially-inwardly adjacent layer.

In some embodiments of drive mechanisms having multilayer belts, the wheels are gears. FIG. 8A is a schematic illustration of another example of a drive mechanism 800 including a multilayer belt 830, having layers $L_1'$-$L_3'$. In some embodiments, the multilayer belt has first rigid portion 832 and a second rigid portion 834 according to aspects of the present invention; however, according to aspects of the invention, multilayer belts as described may operate without forming rigid portions. Wheels 110' and 120' are gears. Wheels 110' and 120' have gear projections 112', 122', respectively, and belt has projection receptacles 835. As shown, at the extremes $EX_1'$-$EX_3'$, layers $L_1'$-$L_3'$ separate from one another to permit rotation around the radius. Accordingly, the layers $L_1'$-$L_3'$ have different lengths than one another to allow for formation of gaps between consecutive belts. For example, where the receptacles are uniformly spaced along the layers, each successive radially outward belt may have one or more (or two or more) additional receptacles 835.

Figure 8B:
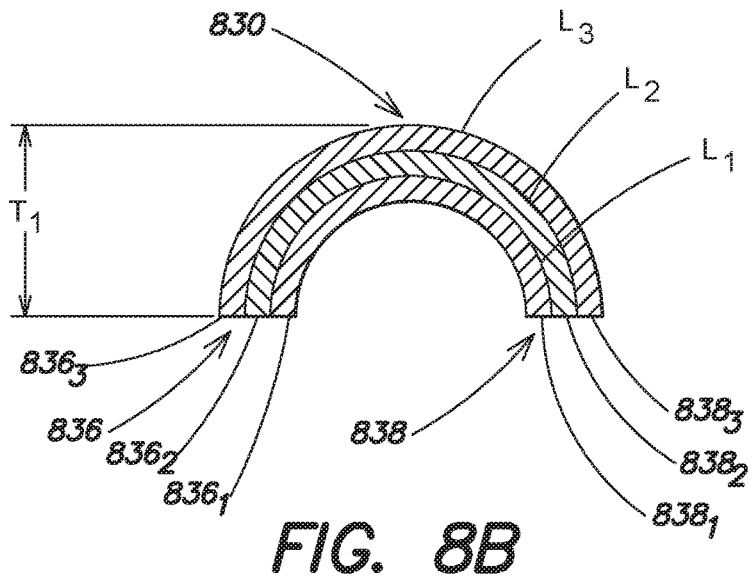
FIG. 8B shows a cross-section view of an unflexed portion of belt of FIG. 8A taken along lines 8B-8B outside of a gear projection receptacle.
Figure 8C:
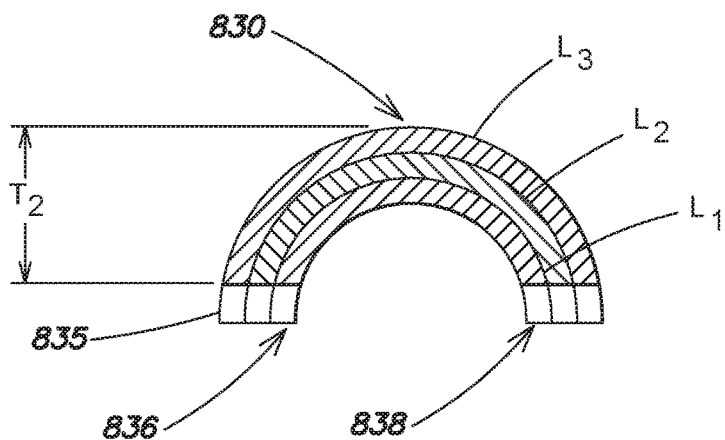
FIG. 8C shows a cross-section view of an unflexed portion of belt of FIG. 8A taken along lines 8C-8C at a gear projection receptacle.

Each layer $L_1'$-$L_3'$ of belt 830 has a channel-shaped cross-sectional shape. Although the belt is shown with three layer, a belt according to this aspect may have two or more layers. FIG. 8B shows a cross-section view of an unflexed portion of belt 830 of FIG. 8A taken along lines 8B-8B where the cross section of each layer $L_1'$-$L_3'$ is an unclosed figure, the cross-section being arcuate. The thickness at the cross section is equal to $T_1$ since the cross section is outside of a gear projection receptacle 835. FIG. 8C shows a cross-section view of an unflexed portion of belt 830 of FIG. 8A taken along lines 8C-8C where the cross section of each layer $L_1'$-$L_3'$ is an unclosed figure, the cross-section being arcuate. The thickness at the cross section is equal to $T_2$ since the cross section is at a gear projection receptacle 835. In some embodiments, the belts may be v-shaped.

Figure 8D:
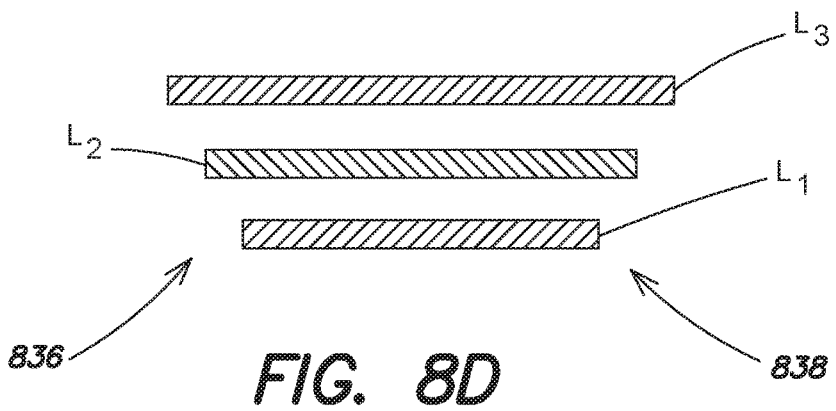
FIG. 8D shows a cross-section view of a portion of the belt of FIG. 8A taken along lines 8D-8D flexed to achieve a flattened state, as occurs when a portion of the belt is stressed as it passes a wheel.

FIG. 8D shows a cross-section view of a portion of the belt of FIG. 8A taken along lines 8D-8D flexed to achieve a flattened state, as occurs when a portion of belt 830 passes a wheel 110', 120' of drive mechanism 800 and a radial force $F_R$ is applied to belt 800 by a wheel 110', 120'. According to these aspects of the invention, the distance between receptacles 835 for each of the layers $L_1'$-$L_3'$ can be selected to match the separation of the projections 112', 122' of wheel/gear 110', 120' in the manner of a rack and pinion design.

Figure 8E:
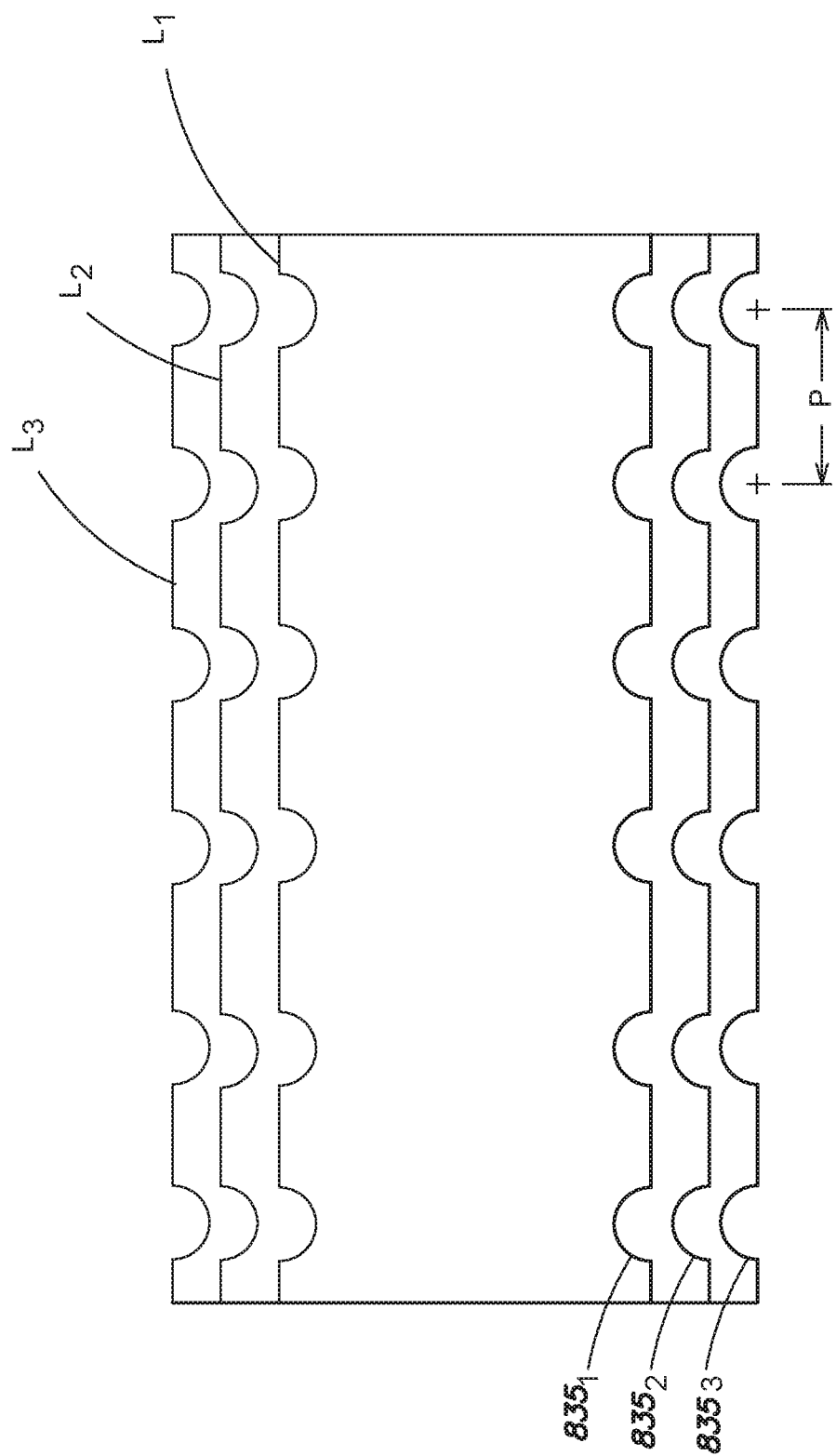
FIG. 8E is a bottom view of the portion of the belt in a flattened state as shown in FIG. 8D.

FIG. 8E is a bottom view of the portion of the belt in a flattened state that is shown in FIG. 8D. As shown in FIG. 8E, when a belt is in a flattened state, each receptacle 835 (shown in FIG. 8A) is separated into portions $835_1$-$835_3$. Each layer $L_1$-$L_3$ has a plurality of cut-outs (i.e., receptacle portions) extending laterally into its sides. Receptacle portions $835_1$-$835_3$ constitute a representative receptacle 835 when the belt layers are curved into the shape of belt 130 in FIG. 8A.

Figure 8F:
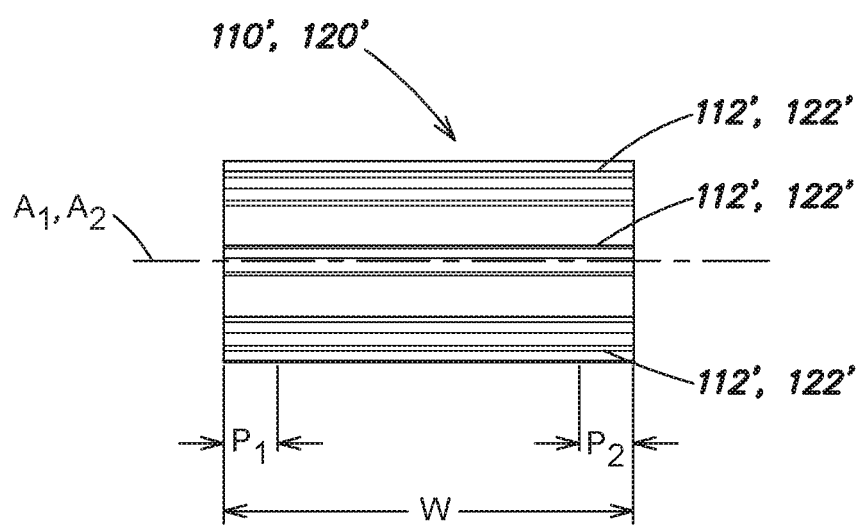
FIG. 8F shows a side view of an example of a wheel for use with the drive mechanism of FIG. 8A.

FIG. 8F is a side view showing further details of wheels 110' and 120'. As shown, gear projections 112', 122' can extend along the entire width W of the wheel or only portions $P_1$ and $P_2$ corresponding to the location of the receptacles 835 where the belt contacts projections 112', 122' on wheel 110', 120'.

As shown in FIG. 8A-8E, according to aspects of the present invention, in a multilayer belt 830 having a channel-shaped cross-section, for use with drive system having wheels 110' and 120' configured as gears, belt 830 has a first edge 836 and a second edge 838, and each layer $L_1$-$L_3$ has a respective first edge $836_i$ and second edge $838_i$. It is to be appreciated that each first edge $836_i$ of the layers is formed at the belt first edge 836 and each second edge $838_i$ of the layers is formed at the belt second edge 838. Typically, when the belt is in an unflexed state, the layers are coextensive with each other at edges 832 and 834.

Each layer $L_i$ has at its first edge $836_i$ a corresponding plurality of receptacles 835 having a first pitch P. The locations of the receptacles 835 of each layers $L_i$ correspond with the locations of the receptacles of each of the other layers $L_i$ such that a single projection on a wheel 110', 120' can extend into a receptacle for each layer. It will be appreciated that, in FIG. 8A, an outer most layer $L_3$ having receptacle portions $835_3$ is visible; however, each of the inner layers has receptacles portions $835_1$-$835_2$ aligned with the receptacles $835_3$ of the outer most layer such that the inner layers are not visible in FIG. 8A.

In some embodiments, each layer has at its second edge 838 (not shown in FIG. 8A) a plurality of receptacles. Similar to the arrangement at first edge 836, for a given layer, the locations of the receptacles comprising the second plurality of receptacles correspond with the locations of the receptacles of each of the other layers $L_i$ such that a single projection on a wheel 110', 120' can extend into a receptacle and the corresponding receptacle portions for each layer. Although the illustrated embodiment includes layers with a channel shape, v-shaped or other suitably shaped layers that permit stacking of layers may be used to form multiple layers for use with gears.

Figure 9A:
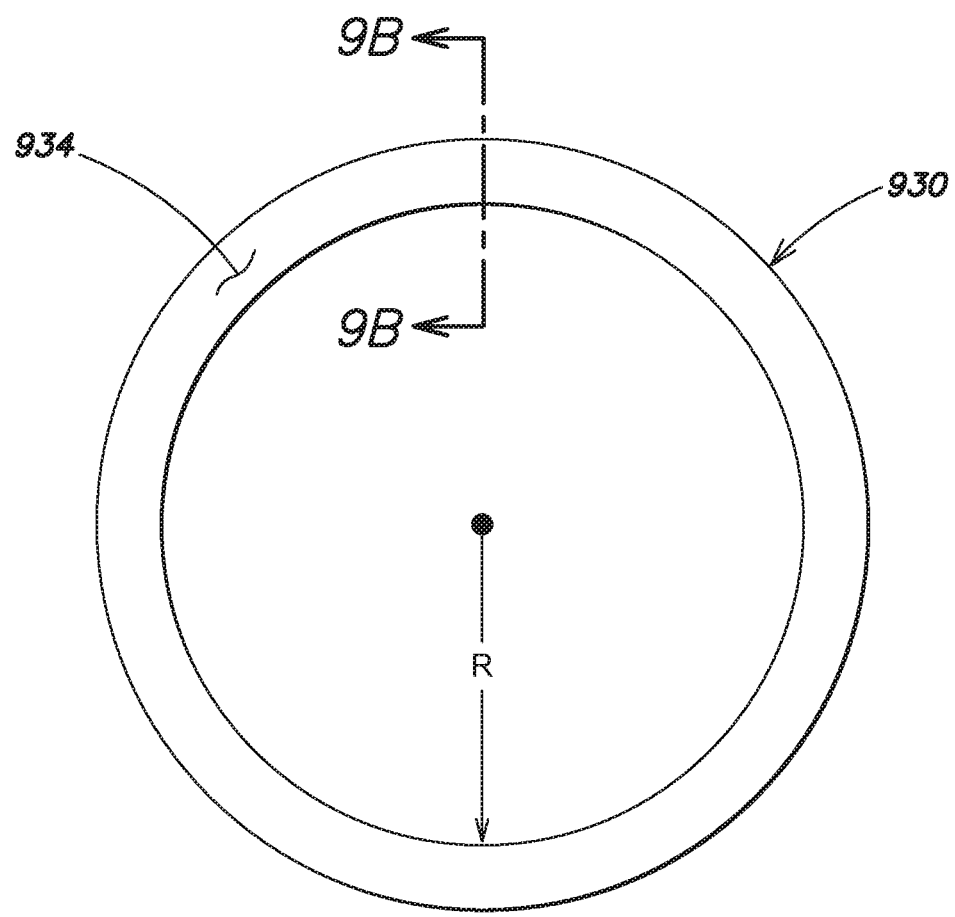
FIG. 9A is a schematic illustration of an example of a circular belt, the belt having a circular shape when in an unstressed state.
Figure 9B:
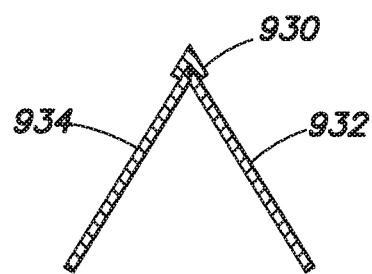
FIG. 9B is a cross-sectional view of the belt in FIG. 9A taken along lines 9B-9B.

FIG. 9A is a schematic illustration of an example of a circular belt 930, the belt having a circular shape when in an unstressed state. FIG. 9B is a cross-sectional view of the belt in FIG. 9A taken along lines 9B-9B. In the illustrated embodiment, the belt has a v-shaped cross-section similar to the belt shown in FIG. 2B. For a circular belt, each of sides 932, 934 may constitute a frustum of a cone.

Figure 9C:
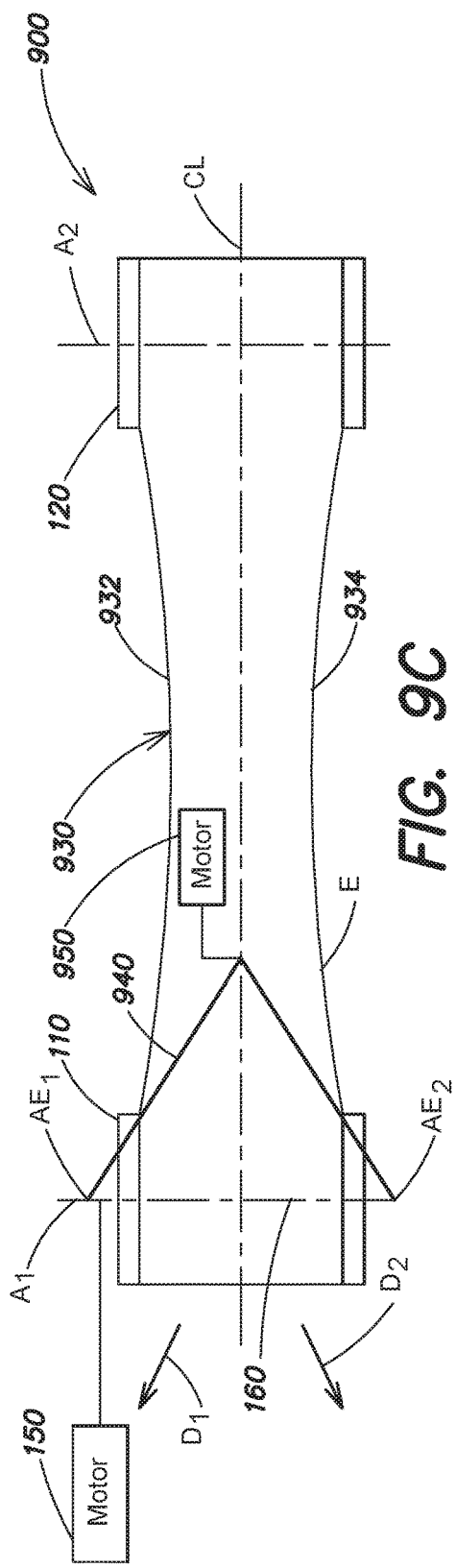
FIG. 9C is a top view schematic illustration of an example of a drive mechanism comprising a circular belt as shown in FIG. 9A.
Figure 9D:
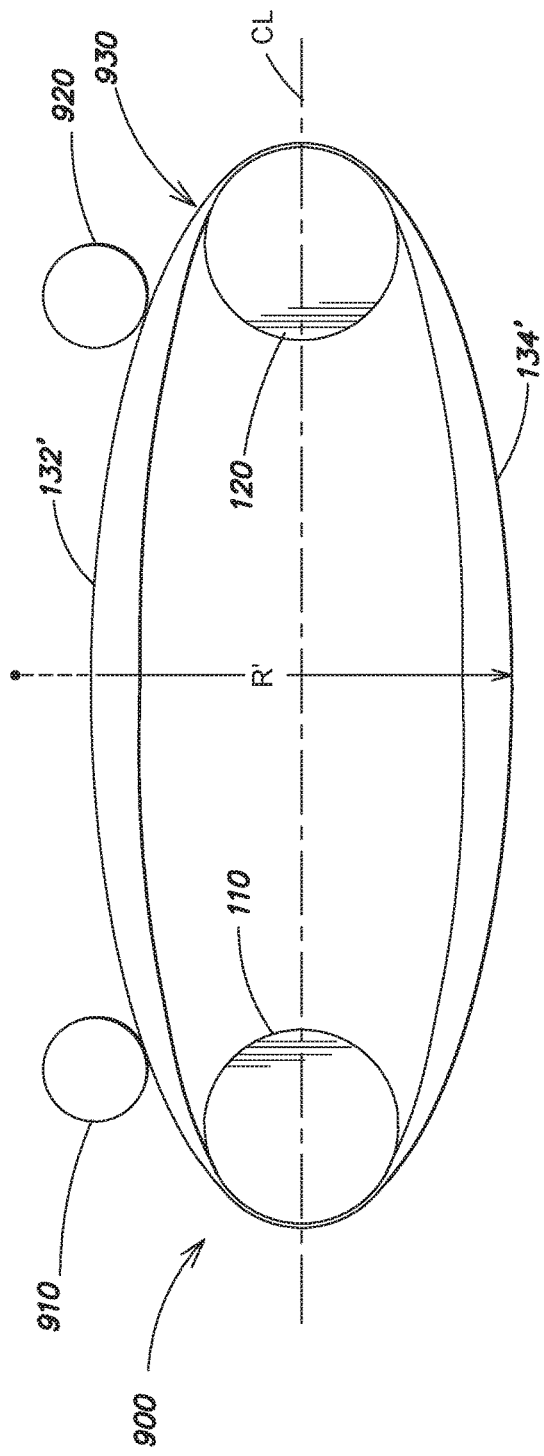
FIG. 9D is a side view schematic illustration of the drive mechanism of FIG. 9C.

FIG. 9C is a top view schematic illustration of an example of a drive mechanism 900 comprising a circular belt. FIG. 9D is a side view schematic illustration of the drive mechanism of FIG. 9C.

Belt 930 is stretched between wheels 110 and 120 such that the outer portions proximate edges E of the belt are in tension, causing an inward bowing as shown in FIG. 9C and such that the center portions proximate center line CL are under compression. It will be appreciated that a belt so configured will form rigid portions 132', 134' between the wheels 110, 120. It will also be appreciated that by using a circular belt as a track, it is possible that a track having an unstressed diameter of R can operate as a track having a diameter R' which is greater than R thereby providing a decreased sensitivity to bumps or holes present on a surface that is encountered by the track.

The belt may be driven by wheels 110 and/or 120 contacting an inner surface of the belt (e.g., a motor 150 may be coupled to one or both axles $A_1$ and $A_2$ to turn one or both wheels 110, 120 to drive the belt), or (as shown in FIG. 9D) may be driven by wheels 910 and 920 contacting an outer surface of the belt. In embodiments driven by wheels contacting an outer surface, wheels 110, 120 may operate simply as idler wheels arranged to maintain the belt in tension and compression as described above.

A vehicle riding on a belt 930 will travel in a straight line if axes $A_1$ and $A_2$ are parallel to one another. As mentioned above, the axes $A_1$ and $A_2$ may be turned relative to one another about center line CL such that they are non-parallel to one another, to achieve turning of a vehicle riding on the belt (i.e., the track). The turning of a wheel 110, 120 may be achieved using any conventional technique and apparatus. A steering mechanism can be coupled to axles $A_1$ and/or $A_2$ to rotate the axles about center line CL. Turning of a vehicle can be achieved by rotation of one of axes $A_1$ and $A_2$, or both $A_1$ and $A_2$ provided that the rotation results in the axes are not parallel to one another. For example, the drive mechanism can comprise a fork 940 coupled to the first end $AE_1$ and second end $AE_2$ of axle $A_1$, and a motor 950 coupled to the fork to rotate the fork about center line CL. Alternatively, the steering mechanism can be constructed without a motor 950 and the axels can be turned manually. It will be appreciated that, embodiments where drive mechanism 900 is configured as a conveyor, rotating the wheel 110 about centerline CL can cause objects (not shown) on the belt to exit the belt in a first direction $D_1$ or a second direction $D_2$.

It is to be appreciated that, other than the circular shape, belt 930 is constructed similarly to belts described above. For example, although the circular belt was described with reference to a v-shaped belt, it is to be appreciated that a belt may have quadrilateral cross-section, a channel-shaped cross-section as described above or other suitable shape. Also, a belt may comprise one or more layers as described above. It is to be appreciated that, as described above, a multilayer belt provides additional rigidity over a single layer belt.

Although embodiments of belt systems above illustrate drive mechanisms including a belt extending around two wheels, it is to be appreciated that aspects of the present invention are directed to a belt system forming a closed shape in the manner described above, without the belt extending around one or both a first wheel (e.g., wheel 110) and a second wheel (e.g., wheel 120). Accordingly, as described below, aspects of the present invention are directed to belt systems comprising a belt as described above having a closed shape.

Figure 10:
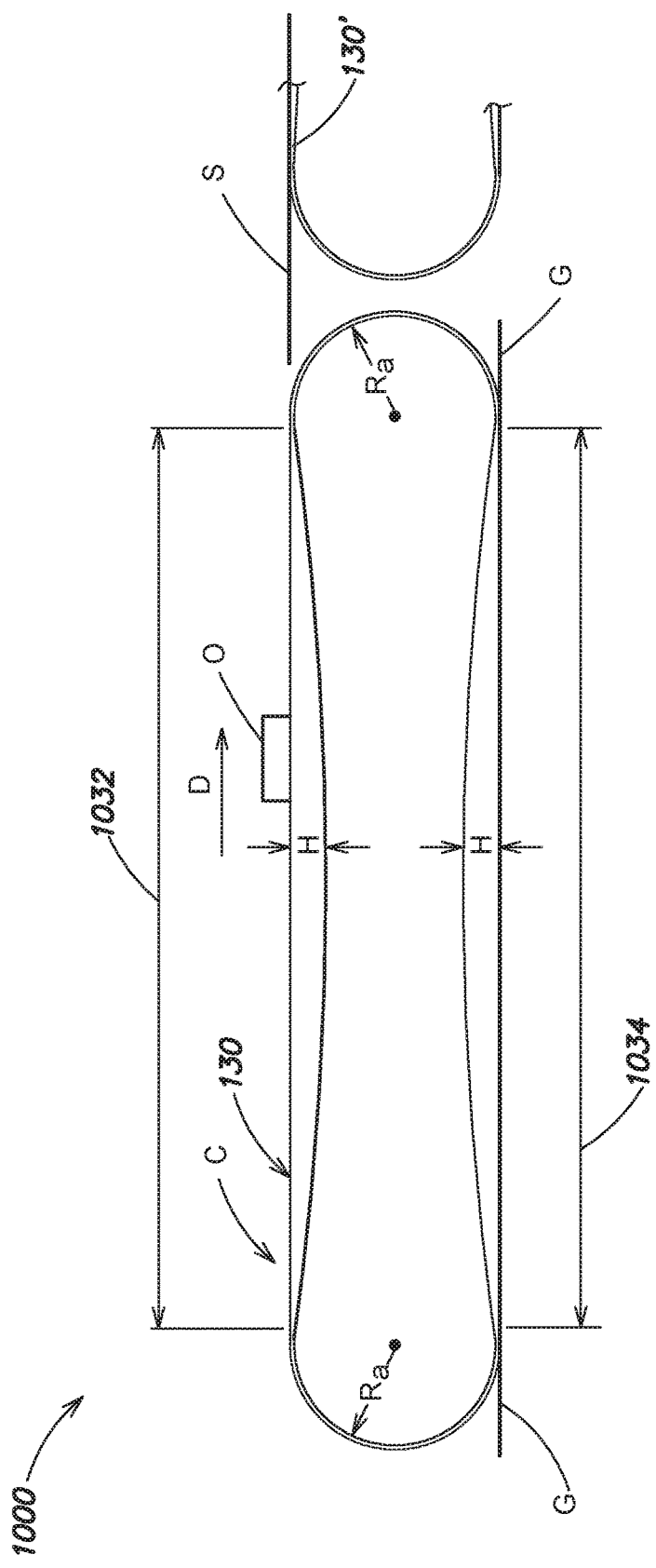
FIG. 10 is a schematic, side view illustration of an example of a belt system including a belt having a closed shape with a circumference, and having a first rigid portion and a second rigid portion according to aspects of the present invention.

FIG. 10 is a schematic, side view illustration of an example of a belt system 1000 including a belt 130 having a closed shape with a circumference C, and having a first rigid portion 1032 and a second rigid portion 1034 according to aspects of the present invention. Like drive system 100 shown in FIG. 1A, belt system 1000 comprises a belt 130 forming a closed shape that defines a circumference C in a longitudinal direction LD.

Unlike the belt system of FIG. 1, the belt system of FIG. 10 does not include first wheel 110 and second wheel 120 to provide a radial force to flatten the belt. Instead, the belt is flattened as a result of traversing a radius Ra at each end of the closed shape and thereby forms a flexible portion of the belt capable of traversing the radius. As indicated above, a system such as system 1000 is said to have virtual wheels. However, the belt remains rigid across portions 1032 and 1034 due to its geometry. As evidenced by the change in height H in FIG. 10, the edges of the belt in a top view (not shown) would be pulled inward between the ends of the belt in the manner shown in FIG. 1B.

It will be appreciated that, as shown in the embodiments illustrated in FIGS. 2B, 3B, 4B and 5B, first rigid portion 1032 and second rigid portion 1034 each have a corresponding cross-sectional height H; and the first rigid portion and the second rigid portion are separated from one another around the circumference by a first flattened portion and a second flattened portion, where the heights H are flattened such that the rigidity ceases to exist as the belt turns around the radius. Similar to embodiments where the belt extends around two wheels, in the embodiment of FIG. 10, after the belt traverses the radius, the belt re-assumes its rigid configuration and height H. The belt of FIG. 10 can have any of the cross-sectional shapes as described above with reference to FIGS. 2A-5C in the embodiments having wheels 110 and 120.

For example, a belt system comprising a belt as described above with reference to FIG. 10, possibly having no wheels or idler pulleys (e.g., consisting of only a belt) may be used to facilitate movement of an object O. It will be appreciated that, in such a configuration, a force can be applied to object O or belt 130 (manually or by a machine) to move the object in direction D (or in a direction opposite to direction D) by causing the belt to rotate. It will be appreciated that the object is typically moved while remaining in a given location on the circumference of the belt. Accordingly, the object can be moved relative to ground G or other support surface without friction or with reduced frictional resistance. The object can be moved on a given belt until it falls off an end of the belt. It will be appreciated that the position where object O falls off an end is determined by the belt construction, as well as the shape of object O.

As shown in FIG. 10, before or when the object falls off an end, the object can be moved to a surface S. The surface S can be any suitable surface, including a surface attached to another belt 130' (shown in partial). Belt 1030' may be configured according to aspects of the present invention. It will be appreciated that, if surface S is attached to another belt 1030', object O could be moved further relative to ground G in the manner described above with reference to belt 1030.

It will also be appreciated that the weight of an object O that can be moved by belt 130 as configured in FIG. 10 is limited by the construction of belt 1030 (e.g., the cross-sectional shape of the belt and the material of which the belt is constructed). To move a given object, the ends operate in a spring-like manner to support the object. If an object O is too heavy for a given belt construction, the belt will not support the object and the ends will fail (e.g., collapse). Belt materials that lend to a spring-like resilience include, for example, plastic reinforced with fiber glass, a metallic material such as spring steel, or a shape-memory material.

Figure 11:
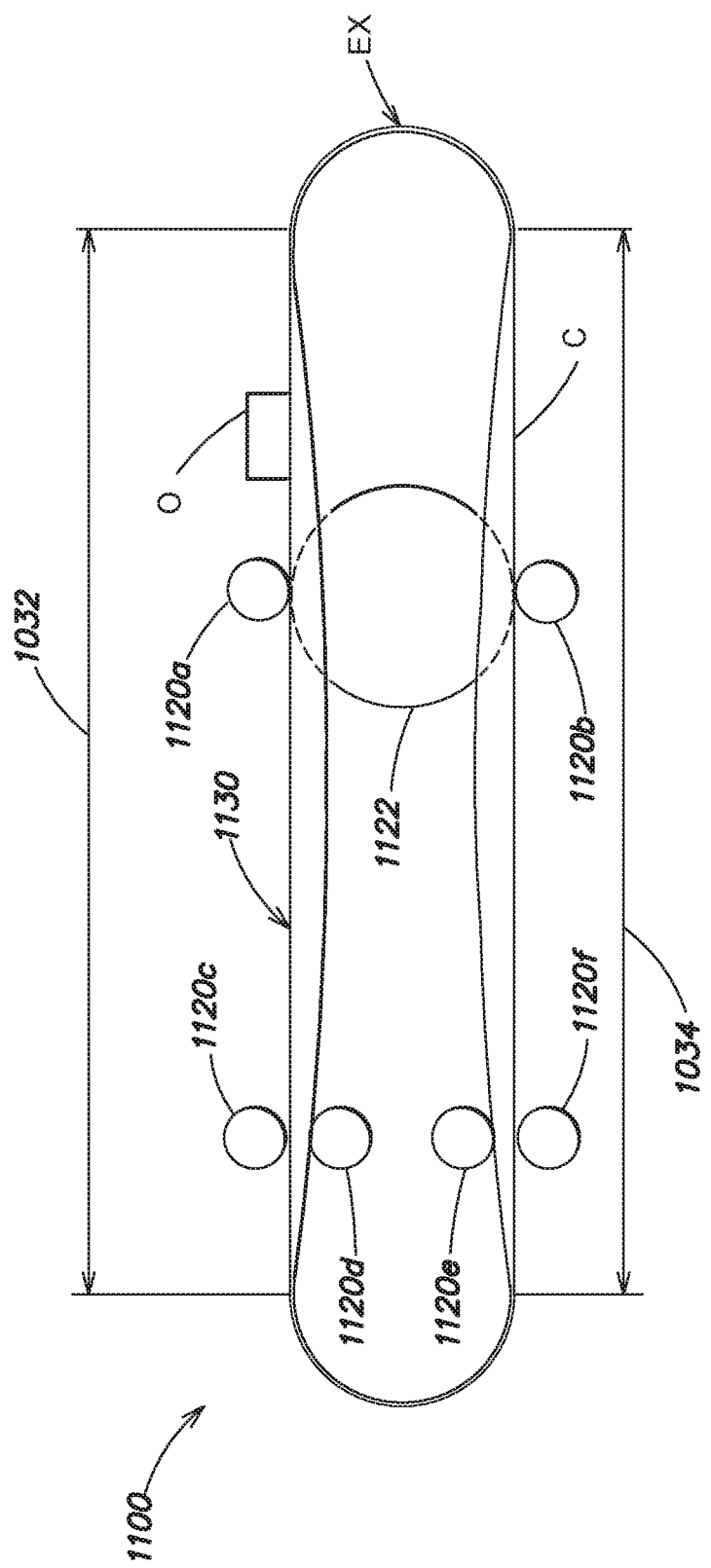
FIG. 11 is a schematic, side view illustration of an example of a belt system including a belt having a closed stadium shape with a circumference, and a first rigid portion and a second rigid portion, and a wheel and idler pulleys to shape the belt according to aspects of the present invention.
Figure 12:
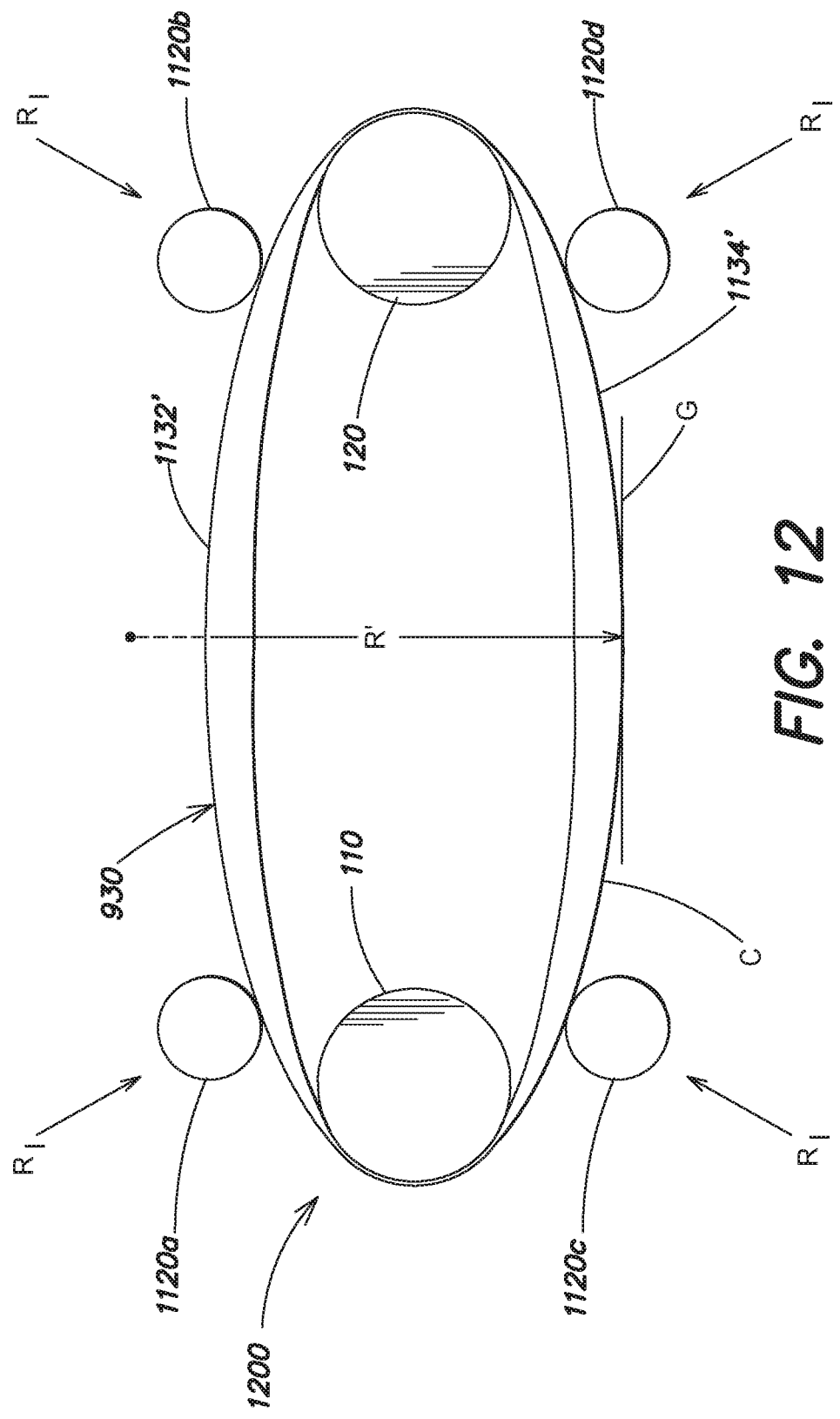
FIG. 12 is a schematic, side view illustration of an example of a belt system including a circular belt (i.e., when unstressed in a radial direction) having a closed shape with a circumference C and a first rigid portion and a second rigid portion, and a wheel and idler pulleys to shape the belt according to aspects of the present invention.

FIG. 11 is a schematic, side view illustration of an example of a belt system 1100 including a belt 1130 having a closed shape with a circumference C, and a first rigid portion 1032 and a second rigid portion 1034 and a wheel 1122 and idler pulleys 1120a-1120f according to aspects of the present invention. Belt system 1100 is similar to belt system 1000 (described above with reference to FIG. 10) except that a wheel 1122 and idler pulleys 1120a-1120e are present to support and/or shape belt 1130. For example, a belt system like belt system 1100 can support an object O at locations beyond wheel 1122 (i.e., between wheel 1122 and extreme EX) which can be useful for moving object O into and out of adverse conditions (e.g., heat, liquid or chemical conditions). It will be appreciated that because object O is supported by a rigid portion 1032 of the belt 1130, the belt can be operated such that only object O and belt 1130 extend into the adverse conditions and mechanical parts such as wheels (e.g., wheel 1122) and pulleys (e.g., pulleys 1120a-1120f) can be kept out of the conditions. In some embodiments, the wheels or pulleys may be configured to cause the belt to rotate (e.g., by extending an axle through a wheel or pulleys and rotating the axle, using a motor or engine or other power source)).

Wheel 1122 would typically have a rounded outer shape or other suitable shape in the direction perpendicular to the plane illustrated in FIG. 11. Such a shape would allow the wheel to contact the belt at the apex or proximate the apex, while allowing the belt to maintain it cross-sectional needed to maintain its rigid state. For example, a wheel 1122 for use with belt 430 (shown in FIGS. 4A-4B) would be round (e.g., in the manner of an inflatable bike tire) to permit contact with apex $AP_1$ while allowing the channel shape to be maintained; and a wheel have round or cone shaped outer shape could be used with a belt 230 as shown in FIGS. 2A-2B FIG. 12 is a schematic, side view illustration of an example of a belt system 1200 including a circular belt 930 having a closed shape with a circumference C. In system 1200, pulleys 1120a-1120e and wheels 110 and 120 are present to support and/or shape belt 930.

It is to be appreciated that, by applying a compressive force (i.e., in a direction $R_f$ toward the interior of the closed shape of the belt) (e.g., using pulleys 1120a-1120e) and/or a tension at the ends (e.g., by using wheels 110 and 120), belt 930 can be caused to achieve rigid portions 1132' and 1134'.

Accordingly, a system including a circular belt can have benefits similar to those described above with reference to FIG. 9 (e.g., a track of a vehicle having an unstressed diameter of R can operate as a track having a greater and perhaps many times greater diameter R' while occupying a relatively small space). A compressive force can be achieved using pulley on top of the belt and pulleys on the bottom of the belt as shown. In such embodiments, wheels on the interior of the belt (e.g., wheels 110 and 120) can be present or omitted. As indicated above, such embodiments operate as if there is a virtual wheel present where the belt traverses the radiuses at the ends of the belt. In embodiments where the belt is operated while contacting ground G or other surface, idler pulleys 1120c and 1120d can be omitted and idler pulleys 1120a and 1120b can compress the belt against ground G to achieve the rigid portions.

A belt system 1200, where wheels 110, 120 apply a tension to the side ends of the belt achieve rigid portions 1132' and 1134', and pulleys 1120a-1120e can be present or omitted.

In some embodiments as described above with reference to FIG. 12, the wheels or pulleys may be configured to cause the belt to rotate. For example, a motor may cause such a wheel or pulley to rotate which in turn rotates the belt.

In some embodiments, a wheel or pulley (shown in FIG. 11 or 12) may be configured to cause the belt to rotate (e.g., by extending an axle through a wheel or pulleys and rotating the axle (e.g., using a motor or engine or other power source)). The belt system may form a drive system of a vehicle.

While the application includes terms of various specific and preferred embodiments, the skilled artisan will appreciate that various modifications, substitutions, omissions, and changes may be made without departing from the spirit thereof. Accordingly, it is intended that the scope of the present application be limited solely by the scope of the following claims, including equivalents thereof.

What is claimed is:

1. A belt system, comprising:
a belt forming a closed shape, the belt defining a circumference in a longitudinal direction, the belt having a first rigid portion and a second rigid portion, the first rigid portion and the second rigid portion being separated from one another around the circumference,
wherein the belt comprises at least two belt layers, the layers disposed at different radial distances than one another, relative to the closed shape,
wherein each belt layer has a corresponding interior surface and a corresponding exterior surface, the exterior surface of each layer defining a corresponding, layer longitudinal extent, and
wherein the interior surface of at least one of the layers extends further than the longitudinal extent of the exterior surface of its interiorly-adjacent layer, thereby forming a gap between at least one of the layers and its interiorly-adjacent layer.

2. The belt system of claim 1, wherein the belt constitutes a drive mechanism, the drive mechanism, further comprising:
a first wheel having a first axis of rotation;
a second wheel having a second axis of rotation; and
the belt extending around the first wheel and the second wheel, the first rigid portion and the second rigid portion each extending from the first wheel to the second wheel, the belt being coupled to each of the first wheel and the second wheel, whereby when the first wheel is rotated about its axis of rotation, the rotation causes movement of the belt along the longitudinal direction such that the first rigid portion provides a pushing force on the second wheel, and the second rigid portion provides a pulling force on the second wheel, and whereby the gap between the at least one of the layers and its interiorly-adjacent layer is disposed at the at least one of the first wheel and the second wheel.

3. The belt system of claim 2, wherein the belt is constructed such that, in an unstressed state, has a stadium shape.

4. The belt system of claim 3, constituting a conveyor.

5. The belt system of claim 3, constituting a track.

6. The belt system of claim 2, wherein the belt has a channel-shaped cross-section.

7. The belt system of claim 2, wherein the cross-section is arcuate.

8. A belt system, comprising:

a belt forming a closed shape that defines a circumference in a longitudinal direction, the belt having a first rigid portion and a second rigid portion, the first rigid portion and the second rigid portion being separated from one another around the circumference, a first wheel having a first axis of rotation;

a second wheel having a second axis of rotation; and the belt extending around the first wheel and the second wheel, the first rigid portion and the second rigid portion each extending from the first wheel to the second wheel, the belt being coupled to each of the first wheel and the second wheel, the belt system having a longitudinal axis extending perpendicular to the first axis and the second axis, wherein the first wheel and the second wheel define a longitudinal extent in the direction of the longitudinal axis, wherein the belt has an interior surface, and wherein the interior surface extends further in the direction of the longitudinal axis than the longitudinal extent at at least one of the first wheel and the second wheel, thereby forming a gap between the belt and the at least one of the first wheel and the second wheel, whereby when the first wheel is rotated about its axis of rotation, the rotation causes movement of the belt along the longitudinal direction such that the first rigid portion provides a pushing force on the second wheel, and the second rigid portion provides a pulling force on the second wheel.

9. A belt system, comprising:

a belt forming a closed shape that defines a circumference in a longitudinal direction, the belt having a first rigid portion and a second rigid portion, the first rigid portion and the second rigid portion being separated from one another around the circumference, wherein the belt comprises a first side, and a second side coupled to the first side, each of the first side and the second side extending around the entire circumference, the first side and the second side coupled together around the circumference to form a first apex along the first rigid portion and a second apex along the second rigid portion, at each of the first rigid portion and the second rigid portion, each of the first side and the second side extending inward relative to the circumference, from a respective one of the first apex and the second apex, wherein the first side and the second side form a V-shaped cross section at the first rigid portion and the second rigid portion the coupling permitting rotation of first side and second side about the first apex and the second apex.

10. The belt system of claim 9, further comprising a tape to provide the coupling of the first side to the second side.

11. The belt system of claim 9, further comprising a spring to provide the coupling of the first side to the second side.

12. The belt system of claim 9, further comprising:

a first wheel having a first axis of rotation;

a second wheel having a second axis of rotation; and the belt extending around the first wheel and the second wheel, the first rigid portion and the second rigid portion each extending from the first wheel to the second wheel, the belt being coupled to each of the first wheel and the second wheel.

13. A belt system, comprising:

a belt forming a closed shape that defines a circumference in a longitudinal direction, the belt having a first rigid portion and a second rigid portion, the first rigid portion and the second rigid portion being separated from one another around the circumference, wherein the belt comprises a first side, and a second side coupled to the first side, each of the first side and the second side extending around the entire circumference, the first side and the second side coupled together around the circumference to form a first apex along the first rigid portion and a second apex along the second rigid portion, at each of the first rigid portion and the second rigid portion, each of the first side and the second side extending inward relative to the circumference, from a respective one of the first apex and the second apex, the coupling of the first side to the second side permitting rotation of first side and second side about the first apex and the second apex, a third side, and a fourth side coupled to the third side, each of the third side and the fourth side extending around the entire circumference, the third side and the fourth side being coupled together around the circumference to form a first nadir along the first rigid portion and a second nadir along the second rigid portion, at each of the first rigid portion and the second rigid portion, each of the third side and the fourth side extending outward relative to the circumference, from a respective one of the first nadir and the second nadir, the coupling of the third side to the fourth side permitting rotation of third side and fourth side about the first nadir and the second nadir, the first side having an outer edge relative to first apex and the second apex, and the third side having an outer edge relative to the first nadir and the second nadir, the outer edge of the first side and the outer edge of the third side being coupled together, the second side having an outer edge relative to the first apex and the second apex and the fourth side having an outer edge relative to the first nadir and the second nadir, the outer edge of the second side and the outer edge of the fourth side being coupled together, whereby, when the belt is coupled on a first wheel and a second wheel, between the first wheel and the second wheel, the belt has a quadrilateral cross section, and when the belt passes over one of the first wheel and the second wheel the belt can flatten.

14. The belt system of claim 13, further comprising:
a first wheel having a first axis of rotation;
a second wheel having a second axis of rotation,
the belt extending around the first wheel and the second wheel,
the first rigid portion and the second rigid portion each extending from the first wheel to the second wheel, the belt being coupled to each of the first wheel and the second wheel
whereby between the first wheel and the second wheel, the belt has a quadrilateral cross section, and when the belt passes over one of the first wheel and the second wheel the belt can flatten.

15. A belt system, comprising:
a belt forming a closed shape that defines a circumference in a longitudinal direction, the belt having a first rigid portion and a second rigid portion, the first rigid portion and the second rigid portion being separated from one another around the circumference, the belt having a tubular cross section.

16. The belt system of claim 15, having edges that overlap at locations along the longitudinal direction.

17. The belt system of claim 15, further comprising:
a first wheel having a first axis of rotation;
a second wheel having a second axis of rotation,
the belt extending around the first wheel and the second wheel,
the first rigid portion and the second rigid portion each extending from the first wheel to the second wheel, the belt being coupled to each of the first wheel and the second wheel
whereby between the first wheel and the second wheel, the belt has a tubular cross section, and when the belt passes over one of the first wheel and the second wheel the belt can flatten.

18. A belt system, comprising:
a belt that defines a circumference in a longitudinal direction, the belt having a first rigid portion and a second rigid portion, the first rigid portion and the second rigid portion being separated from one another around the circumference
wherein the belt comprises at least two belt layers, the layers disposed at different radial distances than one another, relative to the closed shape,
wherein each belt layer has a corresponding interior surface and a corresponding exterior surface, the exterior surface of each layer defining a corresponding, layer longitudinal extent, and
wherein the interior surface of at least one of the layers extends further than the longitudinal extent of the exterior surface of its interiorly-adjacent layer, thereby forming a gap between the at least one of the layers and its interiorly-adjacent layer,
wherein the belt has a first edge and a second edge,
wherein each layer has a respective first edge and second edge, each first edge of each of the layers being disposed at the belt first edge and each second edge of the layers being disposed at the belt second edge,
wherein each layer has at its first edge a corresponding plurality of gear projection receptacles disposed around the circumference, the locations of the plurality of gear projection receptacles of each layer being aligned with the locations of the plurality of gear projection receptacles of the other layers around the circumference.

19. The belt system of claim 18, wherein each layer has at its second edge a corresponding second plurality of gear projection receptacles disposed around the circumference, the locations of the second plurality of gear projection receptacles of each layer being aligned with the locations of the second plurality of gear projection receptacles of the other layers around the circumference.

20. A belt system, comprising:
a belt that defines a circumference in a longitudinal direction, the belt having a first rigid portion and a second rigid portion, the first rigid portion and the second rigid portion being separated from one another around the circumference,
a first wheel having a first axis of rotation;
a second wheel having a second axis of rotation,
the belt extending around the first wheel and the second wheel,
the first rigid portion and the second rigid portion each extending from the first wheel to the second wheel, the belt being coupled to each of the first wheel and the second wheel,
the belt system having a centerline extending perpendicular to the first axis and the second axis, and further comprising a steering mechanism coupled to an axle, the axle extending along the first axis and through the first wheel, the steering mechanism configured to rotate the wheel about the center line.

21. A belt system, comprising:
a belt forming a closed shape, the belt defining a circumference in a longitudinal direction, the belt having a first rigid portion and a second rigid portion, the first rigid portion and the second rigid portion being separated from one another around the circumference,
wherein the belt constitutes a drive mechanism, the drive mechanism, further comprising:
a first wheel having a first axis of rotation;
a second wheel having a second axis of rotation; and
the belt extending around the first wheel and the second wheel,
the first rigid portion and the second rigid portion each extending from the first wheel to the second wheel, the belt being coupled to each of the first wheel and the second wheel,
whereby when the first wheel is rotated about its axis of rotation, the rotation causes movement of the belt along the longitudinal direction such that the first rigid portion provides a pushing force on the second wheel, and the second rigid portion provides a pulling force on the second wheel,
wherein the belt, in an unstressed state, has a circular shape, and
wherein the drive mechanism has a centerline extending perpendicular to the first axis and the second axis, and further comprising a steering mechanism coupled to an axle, the axle extending along the first axis and through the first wheel, the drive mechanism configured to rotate the wheel about the center line.

22. The belt system of claim 21 having a centerline extending perpendicular to the first axis and the second axis, and further comprising a steering mechanism coupled to an axle, the axle extending along the first axis and through the first wheel, the drive mechanism configured to rotate the wheel about the center line.

* * * * *